(12) United States Patent
Xiong et al.

(10) Patent No.: US 12,717,684 B2
(45) Date of Patent: Aug. 25, 2026

(54) SYSTEM AND METHODS FOR MANAGING TIME-BASED EVENTS TO SUPPORT REWINDING OF A DATABASE

(71) Applicant: HUAWEI CLOUD COMPUTING TECHNOLOGIES CO., LTD., Gui Zhou Province (CN)

(72) Inventors: Guanzhu Xiong, Kanata (CA); Alexandre Depoutovitch, Kanata (CA); Lengdong Wu, Kanata (CA); Chong Chen, Kanata (CA); Cheng Zhao, Kanata (CA); Jack Hon Wai Ng, Kanata (CA); Shu Lin, Kanata (CA)

(73) Assignee: HUAWEI CLOUD COMPUTING TECHNOLOGIES CO., LTD., Gui Zhou Province (CN)

( * ) Notice: Subject to any disclaimer, the term of this patent is extended or adjusted under 35 U.S.C. 154(b) by 77 days.

(21) Appl. No.: 18/659,788

(22) Filed: May 9, 2024

(65) Prior Publication Data

US 2025/0348386 A1 Nov. 13, 2025

(51) Int. Cl.
*G06F 11/1446* (2026.01)
*G06F 11/1471* (2026.01)
*G06F 16/21* (2019.01)

(52) U.S. Cl.
CPC ...... *G06F 11/1469* (2013.01); *G06F 11/1471* (2013.01); *G06F 16/219* (2019.01); *G06F 2201/80* (2013.01); *G06F 2201/84* (2013.01)

(58) Field of Classification Search
CPC ............... G06F 11/128; G06F 11/1451; G06F 11/1458; G06F 11/1464; G06F 11/1469;
(Continued)

(56) References Cited

U.S. PATENT DOCUMENTS 11,210,184 B1 * 12/2021 Gupta ................. G06F 11/1471
2008/0120349 A1 * 5/2008 Kim .................... G06F 16/2358
(Continued)

FOREIGN PATENT DOCUMENTS

| | | |
|---|---|---|
| CN | 107077404 A | 8/2017 |
| CN | 109885427 A | 6/2019 |
| WO | 2025123377 A1 | 6/2025 |

OTHER PUBLICATIONS

Microsoft SQL Server 2019 to Amazon Aurora MySQL Migration Playbook: SQL Server to Aurora MySQL Migration Playbook, 2023.

*Primary Examiner* — Michael Maskulinski

(57) ABSTRACT

Support for distributed database backtracking, in which the database is reverted or iteratively reverted to a previous state, is provided. Log sequence number ranges and storage offset ranges for use in reconstructing the previous state are determined and used in the reconstruction. Clock sampling records can be generated indicating a feasible backtracking window with time points indicating allowable times to which backtracking can be performed. Appropriate log records, snapshots and checkpoints for database states are identified and organized with backtracking information record and timeline. A minimal and necessary set of log records, snapshots and checkpoints enabling database reconstruction within a time window is maintained. Measures are taken to maintain the necessary data to support backtracking even after prior backtrackings have occurred in the backtracking time window.

20 Claims, 12 Drawing Sheets

(58) Field of Classification Search
CPC ............. G06F 11/1471; G06F 11/1474; G06F 16/128; G06F 16/2358; G06F 16/2365; G06F 16/27; G06F 2201/84
See application file for complete search history.

(56) References Cited

U.S. PATENT DOCUMENTS

| | | | | |
|---|---|---|---|---|
| 2012/0072394 | A1 | 3/2012 | Joshi et al. | |
| 2016/0342484 | A1* | 11/2016 | French | G06F 11/1469 |
| 2017/0060699 | A1* | 3/2017 | Hohl | G06F 11/1469 |
| 2024/0256398 | A1* | 8/2024 | Manchale Sridhar | G06F 16/2358 |

* cited by examiner

Figure 10:
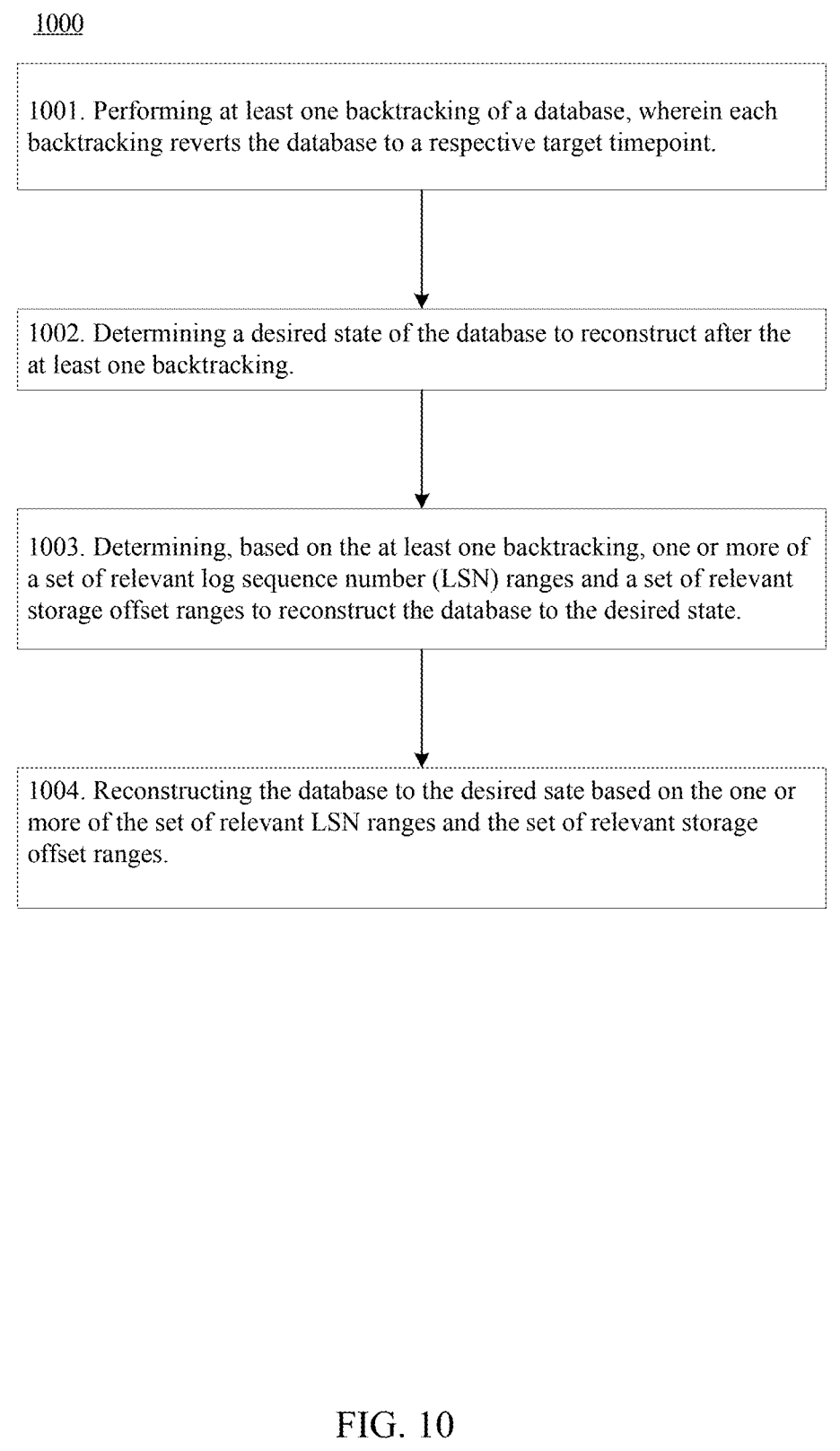

1000

1001. Performing at least one backtracking of a database, wherein each backtracking reverts the database to a respective target timepoint.

1002. Determining a desired state of the database to reconstruct after the at least one backtracking.

1003. Determining, based on the at least one backtracking, one or more of a set of relevant log sequence number (LSN) ranges and a set of relevant storage offset ranges to reconstruct the database to the desired state.

1004. Reconstructing the database to the desired sate based on the one or more of the set of relevant LSN ranges and the set of relevant storage offset ranges.

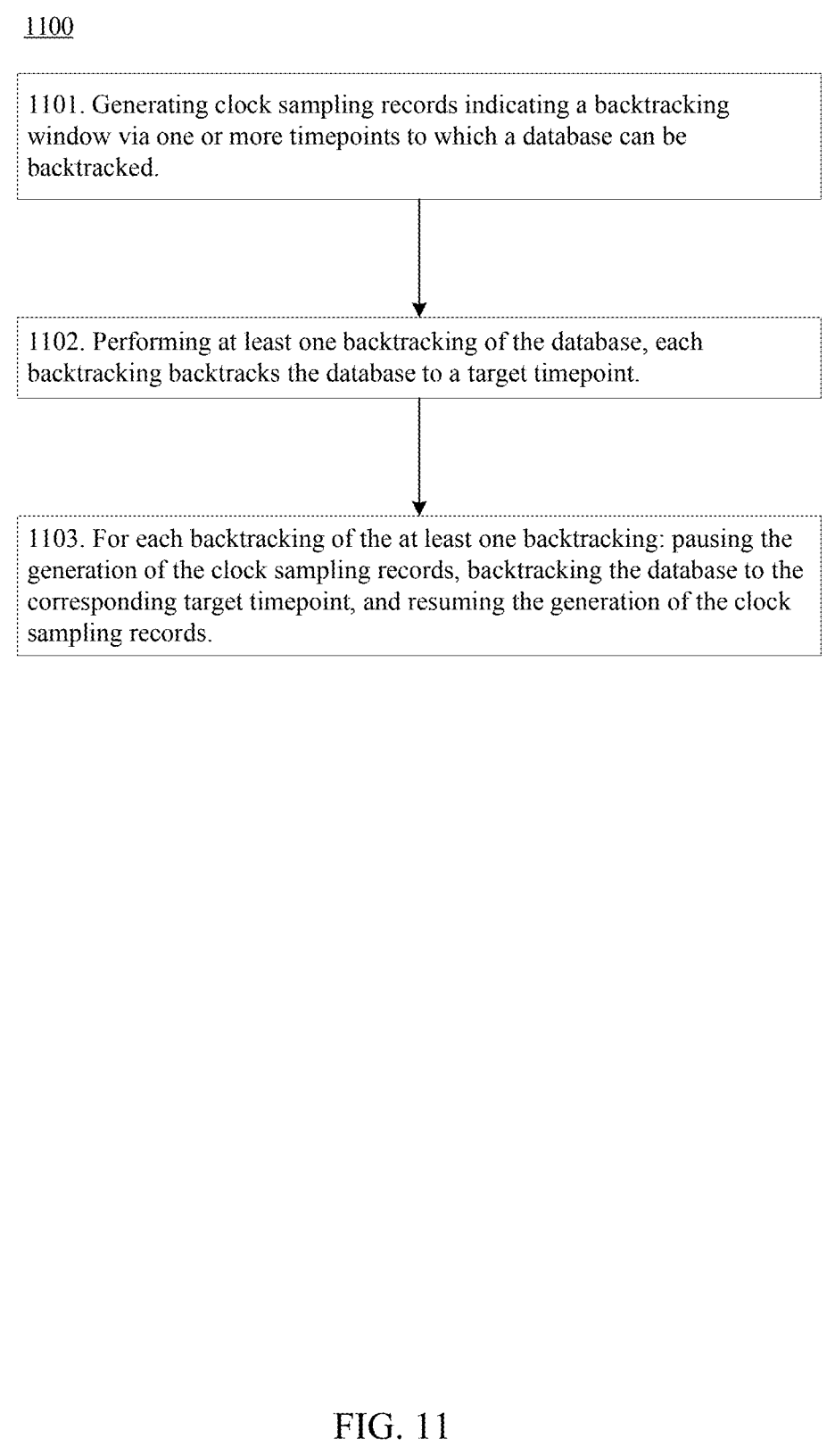

1101. Generating clock sampling records indicating a backtracking window via one or more timepoints to which a database can be backtracked.

1102. Performing at least one backtracking of the database, each backtracking backtracks the database to a target timepoint.

1103. For each backtracking of the at least one backtracking: pausing the generation of the clock sampling records, backtracking the database to the corresponding target timepoint, and resuming the generation of the clock sampling records.

FIG. 11

SYSTEM AND METHODS FOR MANAGING TIME-BASED EVENTS TO SUPPORT REWINDING OF A DATABASE

CROSS-REFERENCE TO RELATED APPLICATIONS

This is the first application filed for the present invention.

FIELD OF THE INVENTION

The present disclosure pertains to the field of database management, and in particular to systems and methods for organizing or managing time-based events to support (e.g., fast iterative) rewinding of a database.

BACKGROUND

Backtracking in a distributed database system refers to the process of reverting a database to a previous state, often essential when errors, erroneous or problematic user actions, or data corruption occur. Backtracking may also be useful when data at a past time is required for special analysis or usage (e.g. testing or training data). However, several challenges can arise due to backtracking. Firstly, dealing with irrelevant data can be complex, as not all historical data may be relevant to the analysis or recovery effort, requiring careful filtering mechanisms. Conflicting data due to time paradoxes can also occur, where multiple versions of data conflict temporally, leading to ambiguity in determining the correct state.

Moreover, supporting backtracking within a defined window requires efficient management of data, ensuring that relevant historical information is retained while minimizing storage overhead. In some cases, data may need to be held for extended periods to support backtracking, which can significantly impact storage size and resource utilization. Balancing the need for comprehensive historical data with storage efficiency and performance becomes a key consideration in designing and operating distributed database systems with robust backtracking capabilities.

Therefore, there is a need systems and methods for organizing or managing time-based events to support (e.g., fast iterative) rewinding of a database that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Systems and methods may be provided for organizing or managing time-based events to support (e.g., fast iterative) rewinding of a database. Systems and methods described herein may provide for identifying and maintaining time-based events or events (e.g., one or more of: log records, anchor snapshots and recovery checkpoints) necessary for multiple reconstructions of a database state as of different points in the past.

According to an aspect of the present disclosure, there is provided a method performed by a distributed database system. The method includes performing at least one backtracking of a database, where each backtracking reverts the database to a respective target timepoint. The method includes determining a desired state of the database to reconstruct after the at least one backtracking. The method includes determining, based on the at least one backtracking, one or more of a set of relevant log sequence number (LSN) ranges and a set of relevant storage offset ranges to reconstruct the database to the desired state. The method includes reconstructing the database to the desired state based on the one or more of the set of relevant LSN ranges and the set of relevant storage offset ranges.

In some embodiments, the method further includes periodically generating clock sampling records. Each clock sampling record indicates a time point to which the database can be reconstructed. Each clock sampling record includes an LSN corresponding to the time point, and a storage offset of one or more events. Each event can be: a log record, an anchor snapshot, or a recovery checkpoint. The method further includes generating backtracking information records based on the at least one backtracking.

In some embodiments, generating backtracking information records includes generating a set of backtracking information records based on a time order. Each backtracking information record of the set of backtracking information records indicates a respective LSN range and further indicates one or more of: a start LSN of the respective LSN range, an end LSN of the respective LSN range, a start storage offset of an event corresponding to the start LSN of the respective LSN range, and an end storage offset of the event corresponding to the end LSN of the respective LSN range. The event may be a log record, an anchor snapshot, or a recovery checkpoint. The set of backtracking information records includes an initial backtracking information record. The respective start LSN is based on when a backtracking feature of the distributed database system is activated. The respective end LSN is based on when a first backtracking of the at least one backtracking is performed. The set of backtracking information records includes at least one backtracking information record corresponding to the at least one backtracking. Each backtracking information record further indicates a target LSN of the corresponding target timepoint to which the database backtracked. For each backtracking information record, the respective start LSN is based on the end LSN of a previous backtracking information record as determined based on the time order. The respective end LSN of each backtracking information record is based on when a next backtracking is performed.

In some embodiments, the above-mentioned determining, based on the at least one backtracking, the one or more of the set of relevant LSN ranges and the set of relevant storage offset ranges to reconstruct the database to the desired state includes the following: determining, from the set of backtracking information records, a first base backtracking information record of a set of base backtracking information records based on the respective LSN range that includes a desired LSN. The desired LSN corresponds to the desired state. The backtracking information records includes the set of base backtracking information records. The above-mentioned determining may further include determining a relevant LSN range of the set of relevant LSN ranges based on a start LSN of the first base backtracking information record and the desired LSN. The above-mentioned determining may further include, for each event of one or more events associated with the first base backtracking information record, determining a relevant storage offset range of the set of relevant storage offset ranges based on a start storage offset of that event of the first base backtracking information record and a storage offset value of that event corresponding to the desired LSN. When the desired LSN is a target for backtracking, one of the clock sampling records corresponds to the desired LSN, and the storage offset value of the event corresponding to the desired LSN is a storage offset value of the event in the clock sampling record corresponding to the desired LSN. Otherwise, to facilitate recovery the storage offset value of the event corresponding to the desired LSN is an indefinite storage offset value. Each event of the set of events is a log record, an anchor snapshot, or a recovery checkpoint.

In some embodiments, the method further includes, beginning from the first base backtracking information record, for each base backtracking information record of the set of base backtracking information records that indicates a target LSN, performing the following action: Determining, from the backtracking information records, a subsequent base backtracking information record of the set of base backtracking information records based on a corresponding LSN range that includes the target LSN of the base backtracking information record. The method may further include determining another relevant LSN range of the set of relevant LSN ranges based on a start LSN of the subsequent base backtracking information record and the target LSN of the base backtracking information record. The method may further include, for each event of one or more events associated with the subsequent base backtracking information record, determining another storage offset range of the set of relevant storage offset ranges based on a start storage offset of said event of the subsequent base backtracking information record and a storage offset value of said event in a clock sampling record corresponding to the target LSN of the base backtracking information record.

In some embodiments, reconstructing the database to the desired state based on the one or more of the set of relevant LSN ranges and the set of relevant storage offset ranges includes determining one or more events for reconstructing the database based on the one or more of the set of relevant LSN ranges and the set of relevant storage offset ranges. The database is then reconstructed based on the one or more events determined for reconstructing the database.

In some embodiments, the method further includes generating a set of timelines based on a time order. Each timeline indicates a set of LSN ranges and a set of storage offset ranges for an event based on the set of the LSN ranges. The event may be a log record, an anchor snapshot, or a recovery checkpoint. The set of timelines includes an initial timeline indicating a respective last LSN range having a start LSN based on when a backtracking feature of the distributed database system is activated. The respective last LSN range of the initial timeline has an end LSN of when a first backtracking of the at least one backtracking is performed. The set of timelines includes at least one timeline corresponding to the at least one backtracking. Each timeline of this at least one timeline corresponds to a respective backtracking of the at least one backtracking and is associated with a respective target LSN corresponding to the target timepoint of the respective backtracking. A latest timeline of the at least one timeline corresponds to a current timeline associated with a latest backtracking of the at least one backtracking. The current timeline indicates a respective last LSN range with an end LSN being based on when a next backtracking is performed after the at least one backtracking. Each timeline of the at least one timeline indicates a respective set of LSN ranges. The set of LSN ranges includes a respective last LSN range with a start LSN based on an end LSN of a previous timeline. The previous timeline is determined according to the time order. The last LSN range ends based on an LSN of when a next backtracking is performed. The set of LSN ranges includes one or more pertinent LSN ranges determined from a set of LSN ranges of a corresponding base timeline. The corresponding base timeline is determined from the set of timelines and includes in its last LSN range the respective target LSN of said each timeline of the at least one timeline. The one or more pertinent LSN ranges includes all LSN ranges up to a last pertinent LSN range. The last pertinent LSN range ends at the respective target LSN of each timeline of the at least one timeline.

In some embodiments, the above-mentioned determining, based on the at least one backtracking, of the one or more of the set of relevant LSN ranges and the set of relevant storage offset ranges to reconstruct the database to the desired state, includes the following: A target timeline from the set of timelines is determined based on a respective last LSN range that includes a desired LSN. The desired LSN corresponds to the desired state. The set of relevant LSN ranges are determined based on all LSN ranges of the target timeline up to a last relevant LSN range. The last relevant LSN range ends at the desired LSN. The set of relevant storage offset ranges is determined based on a set of storage offset ranges corresponding to the determined set of relevant LSN ranges.

According to an aspect of the present disclosure, there is provided another method performed by a distributed database system. The method includes generating clock sampling records indicating a backtracking window via one or more time points to which a database can be backtracked. The method includes performing at least one backtracking of the database. Each backtracking backtracks the database to a target timepoint. The method includes, for each backtracking of the at least one backtracking: pausing the generation of the clock sampling records; backtracking the database to the corresponding target timepoint; and resuming the generation of the clock sampling records following the backtracking.

In some embodiments, the method further includes generating a set of backtracking information records based on a time order. Each backtracking information record of the set of backtracking information records indicates a respective LSN range and further indicates one or more of: a start LSN of the respective LSN range, an end LSN of the respective LSN range, a start storage offset of an event corresponding to the start LSN of the respective LSN range, and an end storage offset of the event corresponding to the end LSN of the respective LSN range. The event may be a log record, an anchor snapshot, or a recovery checkpoint. The set of backtracking information records includes an initial backtracking information record, where the respective start LSN is based on when a backtracking feature of the distributed database system is activated. The respective end LSN is based on when a first backtracking of the at least one backtracking is performed. The set of backtracking information records includes at least one backtracking information record corresponding to the at least one backtracking. Each backtracking information record further indicates a target LSN of the corresponding target timepoint to which the database is backtracked. For each such backtracking information record, the respective start LSN is based on the end LSN of a previous backtracking information record as determined based on the time order. The respective end LSN of each backtracking information record is based on when a next backtracking is performed.

In some embodiments, for each backtracking of the at least one backtracking, after pausing and before resuming the generation of the clock sampling records, the method further includes requesting each slice of the database to generate at least one anchor snapshot; and receiving an indication from said each slice of the database that the anchor snapshot has been generated.

In some embodiments, the method further includes generating a set of timelines based on a time order. Each timeline indicates a set of LSN ranges and a set of storage offset ranges for an event based on the set of the LSN ranges. The event may be a log record, an anchor snapshot, or a recovery checkpoint. The set of timelines includes an initial timeline indicating a respective last LSN range having a start LSN based on when a backtracking feature of the distributed database system is activated. This last LSN range of the initial timeline has an end LSN of when a first backtracking of the at least one backtracking is performed. The set of timelines includes at least one timeline corresponding to the at least one backtracking. Each timeline of the at least one timeline corresponds to a respective backtracking and is associated with a respective target LSN corresponding to the target timepoint of the respective backtracking. A latest timeline of the at least one timeline corresponds to a current timeline associated with a latest backtracking of the at least one backtracking. The current timeline indicates a respective last LSN range with an end LSN that is based on when a next backtracking is performed after the at least one backtracking. Each timeline of the at least one timeline indicates a respective set of LSN ranges including: a respective last LSN range with a start LSN based on an end LSN of a previous timeline. The previous timeline is determined according to the time order, and the last LSN range ends based on an LSN of when a next backtracking is performed. The respective set of LSN ranges further includes one or more pertinent LSN ranges determined from a set of LSN ranges of a corresponding base timeline. The base timeline is determined from the set of timelines and includes in its last LSN range the respective target LSN of the timeline associated with the set of LSN ranges (e.g., said each timeline of the at least one timeline). The one or more pertinent LSN ranges includes all LSN ranges up to a last pertinent LSN range. The last pertinent LSN range ends at the respective target LSN of the timeline associated with the set of LSN ranges.

In some embodiments, for each backtracking of the at least one backtracking, after pausing and before resuming the generation of the clock sampling records, the method further comprises: requesting each slice of the database to generate an anchor snapshot; and receiving an indication from said each slice of the database that the anchor snapshot has been generated.

Aspects and embodiments further provide for an apparatus, system, or both, which includes database and/or computing hardware and which is configured to perform one or more of the methods as described above and elsewhere herein.

According to another aspect, an apparatus may be provided. The apparatus includes modules or electronics configured to perform one or more of the methods and systems described herein.

According to one aspect, an apparatus may be provided, where the apparatus includes: a memory, configured to store a program; a processor, configured to execute the program stored in the memory, and when the program stored in the memory is executed, the processor is configured to perform one or more of the methods and systems described herein.

According to another aspect, a computer readable medium may be provided, where the computer readable medium stores program code executed by a device and the program code is used to perform one or more of the methods and systems described herein.

According to one aspect, a chip may be provided, where the chip includes a processor and a data interface, and the processor reads, by using the data interface, an instruction stored in a memory, to perform one or more of the methods and systems described herein. Aspects may further include the memory.

Other aspects of the disclosure provide for apparatus, and systems configured to implement the methods according to the first aspect disclosed herein. For example, wireless stations and access points can be configured with machine readable memory containing instructions, which when executed by the processors of these devices, configures the device to perform one or more of the methods and systems described herein.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 10 illustrates a method for identifying relevant events for backtracking a database, according to an embodiment.

FIG. 11 illustrates a method of maintaining a minimum set of time-based events for supporting backtracking, according to an embodiment.

It will be noted that throughout the appended drawings, like features are identified by like reference numerals.

DETAILED DESCRIPTION

Figure 1:
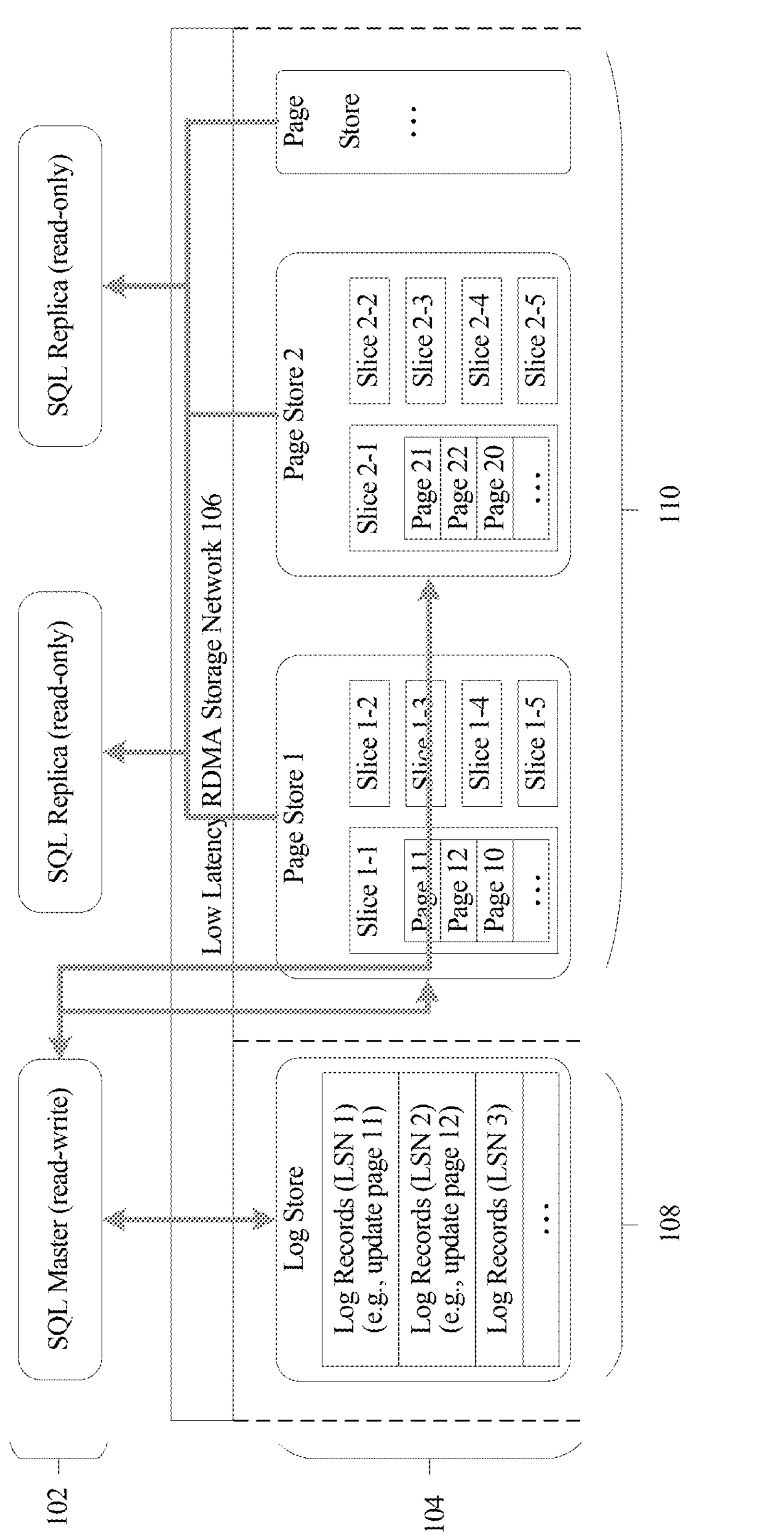
FIG. 1 illustrates a cloud-native distributed database architecture, according to an embodiment.

Systems and methods may be provided for organizing or managing time-based events to support (e.g., fast iterative)

rewinding of a database. Systems and methods described herein may provide for identifying and maintaining time-based events or events (e.g., one or more of: log records, anchor snapshots and recovery checkpoints) necessary for multiple reconstructions of a database state as of different points in the past. Database rewinding is also described in International Patent Application No. PCT/CN2023/139312, the contents of which are incorporated herein by reference.

According to an aspect, a method is provided for identifying relevant events for backtracking a database. The method includes performing at least one backtracking of a database, where each backtracking reverts the database to a respective target timepoint. The method further includes determining a desired state of the database to reconstruct after the at least one backtracking. The method further includes determining, based on the at least one backtracking, one or more of a set of relevant LSN ranges and a set of relevant storage offset ranges to reconstruct the database to the desired state. The method further includes reconstructing the database to the desired state based on the one or more of the set of relevant LSN ranges and the set of relevant storage offset ranges.

According to another aspect, a method is provided for maintaining a minimum set of time-based events for supporting backtracking. The method includes generating clock sampling records indicating a backtracking window via one or more time points to which a database can be backtracked. The method further includes performing at least one backtracking of the database. Each backtracking backtracks the database to a target timepoint. The method further includes, for each backtracking of the at least one backtracking, pausing the generation of the clock sampling records. The method further includes, for each backtracking of the at least one backtracking, backtracking the database to the corresponding target timepoint. The method further includes, for each backtracking of the at least one backtracking, resuming the generation of the clock sampling records following the backtracking.

A data page or a page may refer to a unit of data storage within a database management system. Data of a database may be organized based on smaller-sized items, e.g., pages. A page may have different sizes, such as 4K, 8K, and 16K.

A log record or a change log record may refer to a log entry that documents a change made to data (or a data page) within the database. All changes to a database are done by generating change log records for each individual item (page). An example of a change log record may be a redo log for My Structured Query Language (MySQL), which is a relational database management system.

An LSN may refer to a unique and incremental identifier assigned to each log record. log records may be ordered using LSNs. LSN order may correspond to the order of log record creation. When applying one or more log records to a page to derive a later version of that page, LSN order must be strictly obeyed, otherwise, data may be incorrect.

Log apply may refer to the process of applying changes recorded in a change log record. log records can be applied on one or more pages. For example, a change log record can indicate to write a 10 bytes content on page #20 at storage offset (or offset) 300. After a log record is applied on a page, a new version of the page is generated. Each page may have a corresponding page LSN, which is updated according to the LSN of the last change log record applied.

Database state may refer to status of a database at a specific point in time. Database state may represent how the data is organized and what values are stored in the database tables and other structures. The database state can change as data is inserted, updated, or deleted, and it can be influenced by various database operations and transactions. Database state, at a particular time, may be identified by an LSN, which includes all data page changes up to this LSN. This LSN corresponds to the LSN of the last change log record (corresponding to the last database change) at the particular time.

FIG. 1 illustrates a cloud-native distributed database architecture, according to an embodiment. A database having the architecture 100 may be referred to as a cloud-native distributed database. A cloud-native distributed database may be designed for cloud infrastructure with separate compute layer 102 and storage layer 104. An example of such a database is Huawei Cloud GaussDB (for My Structured Query Language (MySQL)).

In an embodiment, the compute layer 102 comprises one or more of: a Structured Query Language (SQL) master and one or more SQL replicas responsible for accepting and processing user queries. In an embodiment, one or more transactions including inserting, updating and deleting data pages, of user queries, are handled by the SQL master. In some embodiments, the SQL master generates log records and ships log records to the storage layer 104 over a network (e.g., a low-latency remote direct memory access (RDMA) storage network 106).

In some embodiments, the storage layer 104 comprises one or more of: a log store 108 and a page store 110 as illustrated. In some embodiments, the log store 108 is used to persist log records generated by the SQL master, with LSN order, which can be read out and re-distributed to the one or more page stores 110 at any time. In some embodiments, the one or more page stores store the pages, and pages are partitioned and organized into one or more data slices (called slices) in the one or more page stores. In some embodiments, the one or more page stores serve page read requests coming from the SQL master or replicas, with applying log records generated and distributed by the SQL master. In some embodiments, a database includes tens to thousands of slices located in several to tens of page stores.

Backtracking in databases involves rewinding the database to any point in the past, navigating back and forth iteratively. In some embodiments, this process reconstructs the desired database state within the database itself, without the need for backup files or restoration. As a result, backtracking may be performed in a relatively short time, often taking only minutes. Moreover, this backtracking can be performed iteratively, which may allow for precise timepoint adjustments down to the second level.

In some instances of a database crash, a database instance may not restart. The only way to bring the system back may be to restore from backup images, but since the instance may have a very large dataset, restoration may take hours to complete. As part of restoration, a new instance with changed virtual internet protocol (IP) address is created, which further requires the configuration of the original client application to be modified or adjusted to ensure that the client application functions correctly. As a result, the client business services may be interrupted for quite a long time.

Similarly, for any database product, various mistakes or problems can cause failure. For example, data can be lost or corrupted due to any software or hardware error or failure. Further, erroneous user actions can occur occasionally. For instance, a user may mistakenly perform a destructive action, such as a DELETE without proper WHERE clause. In addition, malicious actions may be taken to break into, alter or damage the database on purpose.

Therefore, customers may require a functionality that allows them to rewind their database cluster back and forth to a specific point in time. This capability helps them identify when a specific data change occurred, rectify significant errors, or restore the database to a state prior to corruption. Backtracking may offer a fast and unique method to retrieve data from any past time, particularly useful for test environments, data history tracking, and historical data analysis purposes.

Figure 2:
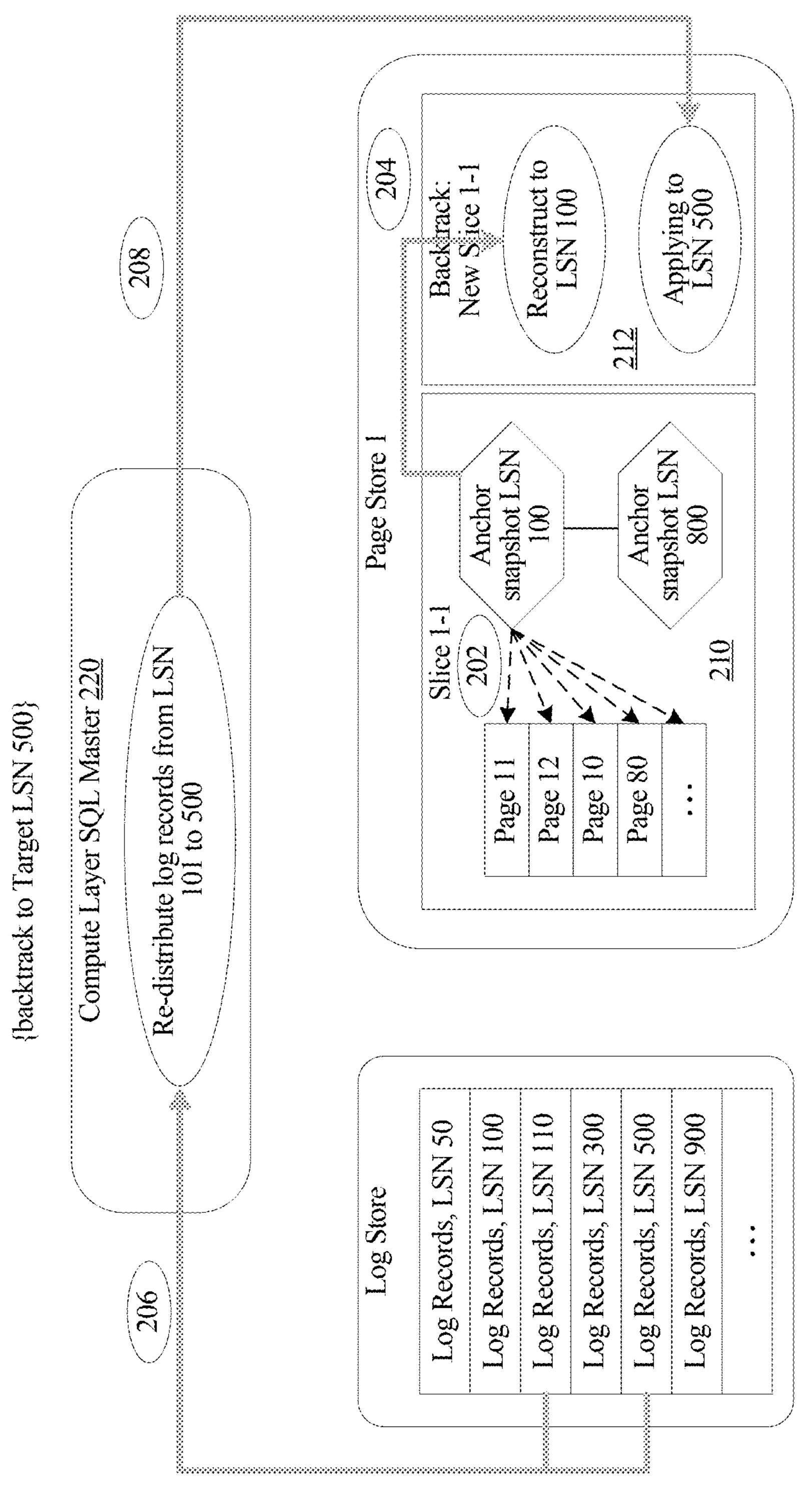
FIG. 2 illustrates a backtracking architecture for a distributed database, according to an aspect.

FIG. 2 illustrates a backtracking architecture for a distributed database, according to an aspect. In an embodiment, each slice of the one or more page stores 110 regularly (e.g., every 20 minutes) generates an anchor snapshot (or snapshot) of all the pages in the slice, at certain timepoint (as denoted by an LSN value). In an embodiment, with loading an anchor snapshot, the data of the pages of the slice can be reconstructed to the state as represented by the LSN.

In an embodiment, backtracking a distributed database involves rewinding the distributed database to a timepoint in the past represented by a certain LSN value, which may be called the target LSN. This target LSN corresponds to the timepoint in the past to which the database is rewound. For example, a distributed database may be backtracked to a target LSN 500.

In an embodiment, backtracking includes, for each slice 210 of the one or more page stores 110, from the end of the anchor snapshot list, finding or determining 202 an anchor snapshot with LSN that is less than and closest to (or equal to) the target LSN (e.g., the anchor snapshot of LSN 100 in FIG. 2).

In an embodiment, backtracking further includes, for said each slice 210 of the one or more page stores 110, the one or more page stores creating 204 a new slice 212, loading the anchor snapshot found (e.g., the anchor snapshot of LSN 100), and replacing the original slice 210. In the example, after loading the anchor snapshot, the new slice 212 is at a state indicated by LSN 100.

As may be appreciated, the new slice 212 still needs the log records based on an LSN range indicated from the LSN of the anchor snapshot (LSN 100) to the target LSN 500, to update the pages to the target LSN. Accordingly, the new slice 212 still need log records from LSN 101 to LSN 500.

Thus, in some embodiments, backtracking further includes, for said each new slice 212, obtaining 206 the relevant log records (referring to one or more log records needed to update the new slice from the LSN of the anchor snapshot to the target LSN). In some embodiments, after creating a corresponding new slice for said each slice of the one or more page stores, and loading a corresponding anchor snapshot for said each new slice, the compute layer SQL master 220 reads the log records that the slices needed, from the log store, and then re-distributes 208 them to all the slices.

In some embodiments, backtracking further includes applying the obtained relevant log records to said each new slice 212. In some embodiments, each new slice applies the log records received, to the data pages, to reconstruct the database state corresponding to the target LSN.

Backtracking may present several challenges. Backtracking may generate irrelevant log records, snapshots, and checkpoints during the backtracking process. Backtracking may pose difficulties in maintaining essential or relevant log records and snapshots. Backtracking may further result in the prolonged retention of log records and snapshots during a new start as described herein.

As may be appreciated, backtracking relies on slice anchor snapshots (or anchor snapshot or snapshot) and reapplication of log records. Also, for crash recovery, the SQL master or slice crash recovery may need recovery checkpoint (CP) in the past and relevant log records for reapplying. Recovery can refer to an action to make the database available again after an event such as a crash or shutdown. The database state immediately before the crash or shutdown is reconstructed. Thus, events may be re-applied until the latest database state (rather than a definite prior state) is obtained.

Figure 3:
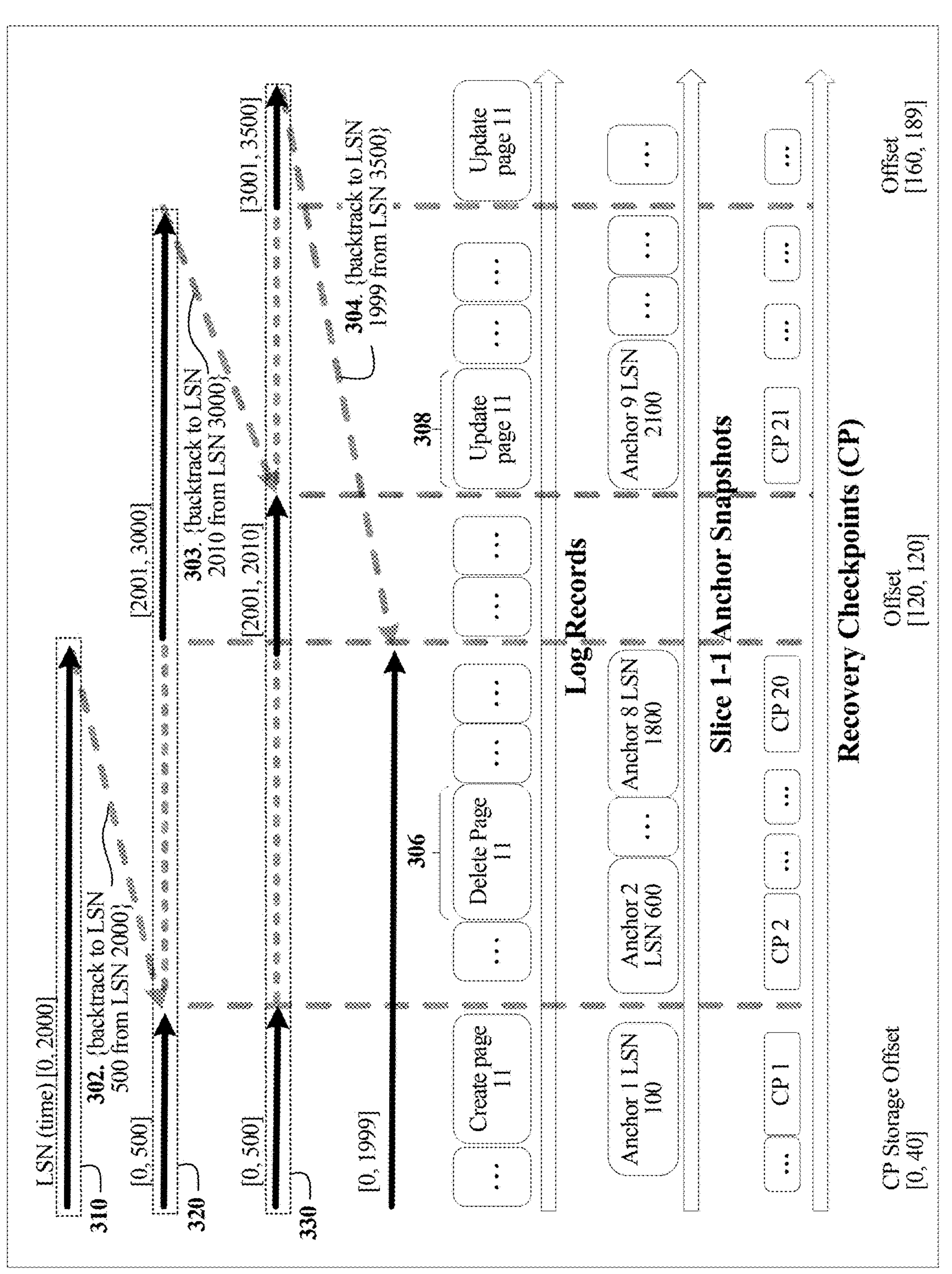
FIG. 3 illustrates one or more database events identified as irrelevant, according to an embodiment.

After a backtracking, for a database state, one or more time-based events may become irrelevant. A time-based event or an event may refer to a log record, anchor snapshot or a recovery CP. An irrelevant event may refer to an unusable event which if used could produce incorrect data. For example, FIG. 3 illustrates one or more irrelevant events, according to an embodiment. In an embodiment, after a first backtracking 302 to LSN 500 from LSN 2000, one or more events become irrelevant for the database state of LSN from 2001 to 3000. The one or more irrelevant events include: log records in LSN range [501, 2000], slice anchor snapshots indicated via anchor 2 to 8 (which correspond to LSN range [501, 2000]), and the recovery CP 2 to 20 (corresponding to LSN range [501, 2000]). However, if a backtracking 304 to LSN 1999 from LSN 3500 is performed, then these irrelevant events could become relevant again for the database states after LSN 3500.

In addition, due to backtracking, log records may conflict with each other (as time paradox in sci-fi or physics). For example, as shown in FIG. 3 for Page 11, the log record indicating "Delete Page" 306 and the log record indicating "Update Page" 308 are conflict. If the log records are applied wrongly, the database state could become erroneous, or the database could have incorrect data.

Accordingly, on backtracking or crash recovery, only the anchor snapshot or recovery CP relevant to the database state to be reconstructed or recovered, should be used, and only the log records relevant to the database state to be reconstructed or recovered, should be applied. For example, in FIG. 3, If the SQL master crashed at a time corresponding to LSN 3002, the recovery CP, CP 1, should be used, and only the log records in LSN ranges [0,500], [2001,2010] and [3001, 3002] should be re-applied. Therefore, there is a need to organize events (e.g., the log records, snapshots and checkpoints) so that relevant events can be identified for the database state at a particular time (as may be denoted by LSN).

As may be appreciated, to support backtracking, all the related time-based events (e.g., log records, snapshots and checkpoints) should persist in storage. Due to storage limitations, backtracking may typically be supported for only a certain time period (e.g., the past 80 hours). This time period may be referred to as the backtracking window, backtracking window size or backtracking window period.

In some embodiments, the backtracking window front is shifted forward, periodically (e.g., 20 minutes or hourly), with current time (LSN) as window end. The backtracking window front may refer to the earliest point in time (or timepoint) to which the database can be backtracked. This shifting of backtracking window front may be referred to as backtracking window shifting. The shifting does not simply mean moving the window front forward. Shifting may require ensuring that any timepoints in the backtracking window can be successfully backtracked. This challenge is further described in reference to FIG. 4.

Figure 4:
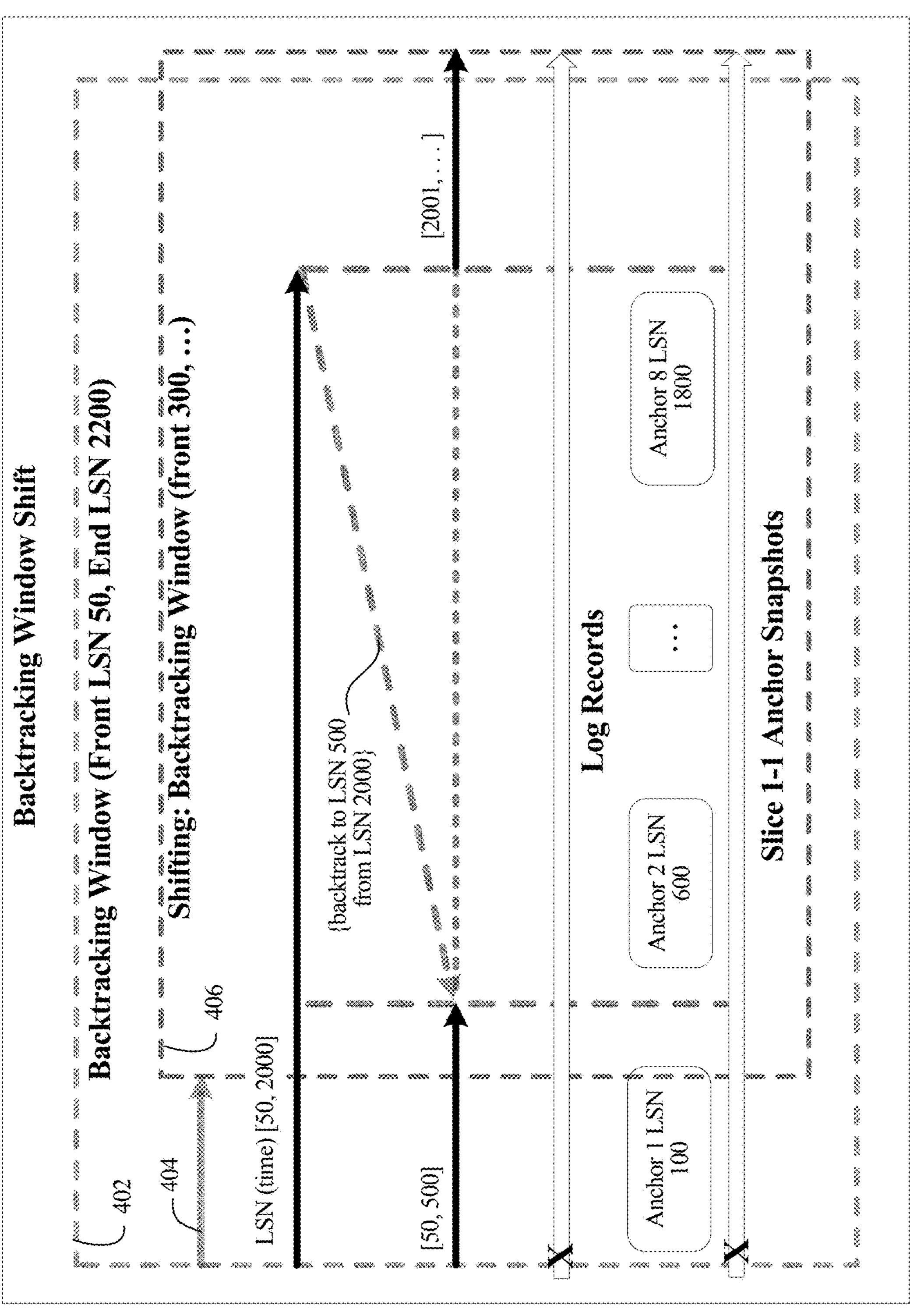
FIG. 4 illustrates backtracking window shifting, according to an embodiment.

FIG. 4 illustrates backtracking window shifting, according to an embodiment. In an embodiment, the backtracking window is set to support backtracking for the past 80 hours.

At a particular time, the backtracking window 402 is based on (or defined with) a front LSN 50 and an end LSN 2200. At this particular time, the backtracking window 402 exceeds the window size of 80 hours. Consequently, the backtracking window front is shifted 404 from LSN 50 to LSN 300 to maintain the required backtracking window size of 80 hours. To support backtracking to any timepoints in the new backtracking window 406, the anchor snapshot, Anchor 1 of LSN 100, still needs to be kept, as well as the log records in the LSN range [101, 500].

As a result, backtracking may require identifying or determining the necessary events (e.g., log records and anchor snapshots) that need to be maintained for supporting backtracking within the backtracking window. This process may further involve computing the storage offset values of the time-based events, which may be used to truncate one or more events from the storage and clean from the cluster. Accordingly, it is desirable to maintain only necessary log records and anchor snapshots for supporting backtracking and when shifting backtracking window.

Figure 5A:
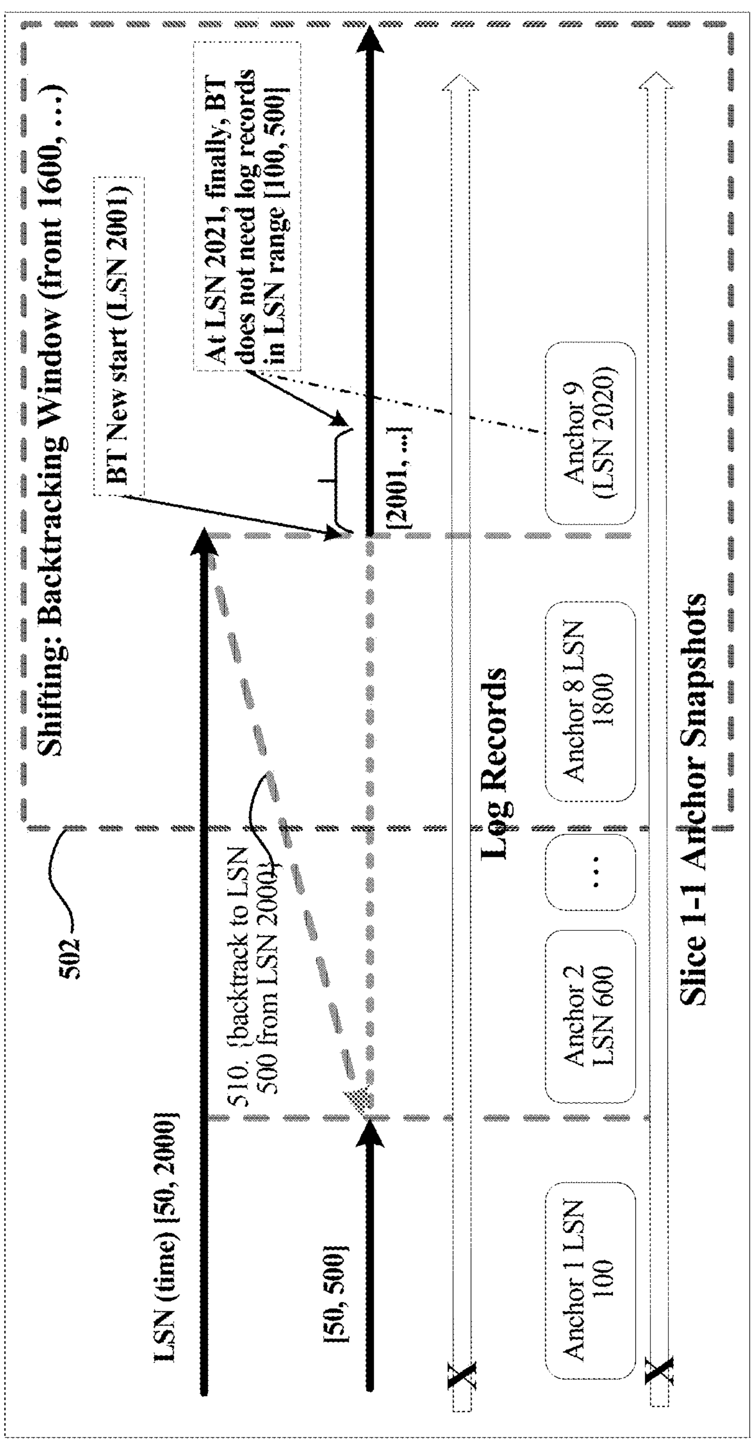
FIG. 5A illustrates backtracking new start holding old events, according to an embodiment.
Figure 5B:
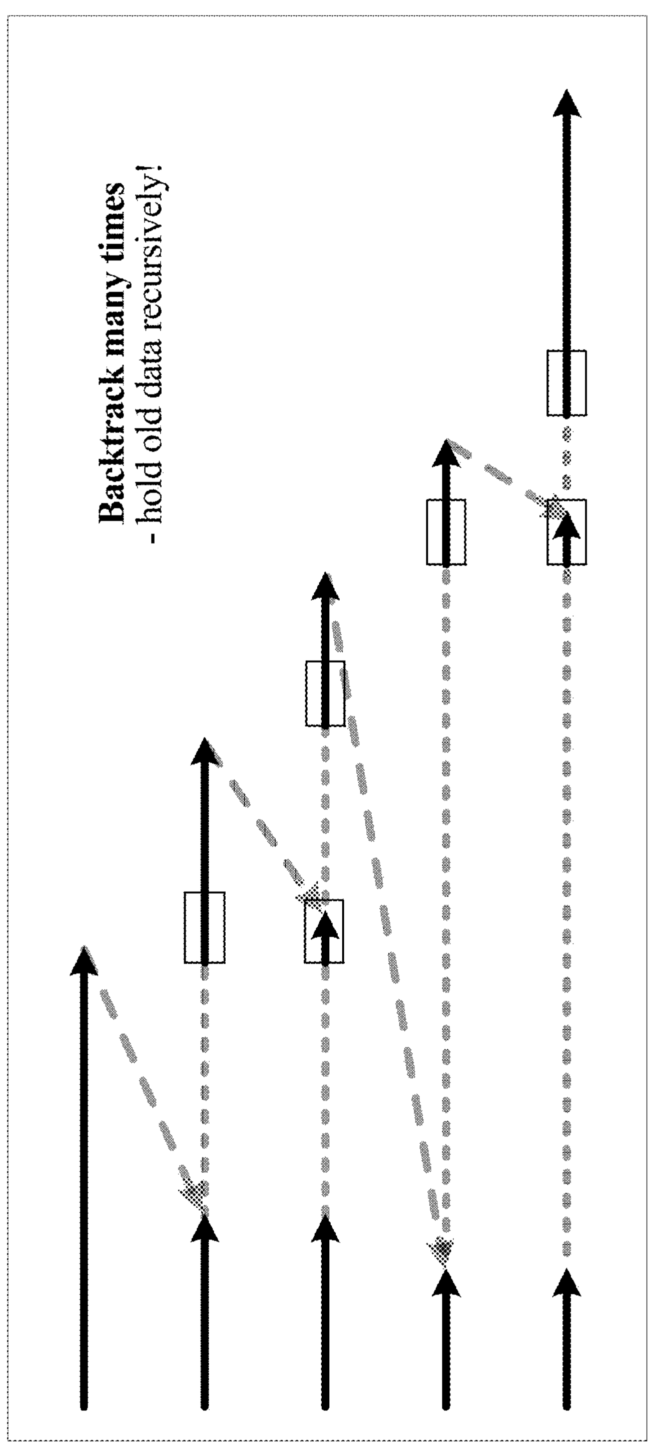
FIG. 5B illustrates old events being kept for a long time, according to an aspect.

In some cases, backtracking can pose a data protection challenge: following a backtracking (Backtracking New Start), the related time-based events (log records, anchor snapshots, and checkpoints) may be retained for an extended period to facilitate backtracking to those timepoints as described in reference to FIG. 5A and FIG. 5B.

FIG. 5A illustrates backtracking new start holding old events, according to an embodiment. In an embodiment, when backtracking 510 to LSN 500 from LSN 2000, the anchor snapshot, anchor 1 of LSN 100, is used, and the log records in the LSN range (100, 500] are re-applied to the one or more slices (e.g., slice 1-1). At a particular time, the backtracking window 502 has a backtracking window front of LSN 1600, which indicates that backtracking is supported from LSN 1600 until backtracking window end, which is after LSN 2021 as shown. However, after backtracking new start, LSN 2001, until LSN 2020, slice 1-1 has not generated an anchor snapshot for supporting backtracking, since anchor 9 has LSN 2020 (i.e., generated at LSN 2020). This means that if a backtracking is to be performed to any timepoint indicated by the LSN range 2001 to 2020, then slice 1-1 may need anchor 1 LSN 100 and log records in the LSN range (100, 500] for supporting backtracking. Therefore, if the database backtracks to a target LSN between LSN 2001 and LSN 2020, the anchor snapshot, anchor 1, and log records in the LSN range (100, 500] are still needed. The anchor snapshot, anchor 1 and log records in the LSN range (100, 500] cannot be truncated until backtracking window front LSN has reached LSN 2021.

As described, to backtrack to an LSN between LSN 2001 and 2020 (after performing backtracking 510 from LSN 2000 to LSN 500), anchor 1 LSN 100 and related log records (in the LSN range (100, 500]) are needed, since that's the latest anchor available for backtracking to an LSN between LSN 2001 and 2020 (as anchors 2 to 8 are invisible due to the backtracking from LSN 2000 to LSN 500). Only after LSN 2021, when the anchor 9 is generated, can backtracking use anchor 9 LSN 2020. So, while the LSN 2001 to 2020 are within the backtracking window, the database still needs to keep anchor 1 and related log records to support backtracking to an LSN between LSN 2001 and 2020. Once the backtracking window front moves to LSN 2021, then anchor 1 and related log records can be removed, as LSN 2001 to 2020 are no longer in the backtracking window and thus there is no need for anchor 1 and related log records to be kept for supporting backtracking.

In some cases, the time from LSN 100 to LSN 2021 could be near 3 days, and thus, the anchor snapshot, anchor 1 and the log records in the LSN range (100, 500] may be kept for 3 days longer than the length of backtracking window, which itself may be 3 days, resulting in keeping events of 6 days old. This may result in keeping events much older than the backtracking window period and consuming more storage.

One solution may be to limit the storage use, which may be implemented by shifting the backtracking window front to LSN 2021, after anchor 9 LSN 2020 has been generated. So, this jumping of the backtracking window front to LSN 2021 can allow the old events (e.g., anchor snapshot and log records) that are held based on backtracking new start to be truncated. However, this jumping may result in dramatic shrinking of the backtracking window size, for example, from 80 hours to 2 hours, which may contradict or conflict with a backtracking window size set by a customer.

In some cases, old events could be held for a long time, for example, after performing many backtracking, old log records and anchor snapshot may be held recursively for a long time as shown in FIG. 5B. FIG. 5B illustrates old events being kept for a long time, according to an aspect. As illustrated, backtracking many times may result in old events being kept recursively for a long time.

Accordingly, it is desirable to support backtracking without holding old events for a long time so that a minimum set of events (e.g., minimal set of the necessary log records and anchor snapshots) is maintained.

Existing solutions that support backtracking functionalities include Amazon Web Services® (AWS®) Aurora. Aurora backtracking retains log records in a first-in-first-out (FIFO) buffer in the storage and moves the database to the desired point of time by replaying sufficient change log records. However, Aurora backtracking is different from backtracking of distributed database architecture as described in reference to FIG. 1 and FIG. 2.

Currently, Aurora backtracking feature may only be enabled on Aurora database instance creation. Further, after the backtracking feature is disabled, by setting backtracking window size to 0, the backtracking feature cannot be enabled again for the Aurora database instance.

For Amazon® Aurora backtracking, log records are retained in a common storage shared between multiple different clients. If the change log records take up too much space, the resulting lack of remaining space may impact other unrelated peer clients. Any hot-spot or imbalance on a single storage node due to change log records accumulation can result in backtracking being turned off or reduction in the actual restorable time window size contrary to customer expectations. For example, an experiment was conducted using the Amazon Aurora backtrack for a large dataset (1 TB) with heavy write-only workload. In this experiment, the actual restorable time window size was determined to be around 3 hours, despite a user being able to define a longer target restorable time window size (e.g., 72 hours).

Another existing solution to database recovery is the Oracle® Flashback. Oracle Flashback supports rewinding database to a time in the past (not backtracking functionalities). For Oracle Flashback, log files are used with an in-memory circular buffer and are not persisted to disk. Further, historical flashback log data will be overwritten after the desired timepoint due to limited buffer size. Thus, Oracle Flashback can only rewind backward, but not rewind forward. For example, after a flashback from T2 to T1 (where T1 is prior to T2), flashback logs between T1 and T2 will be overwritten by new flashback logs, and thus any timepoint between T1 and T2 is not achievable or rewindable later. Further, oracle flashback may only be performed when the database instance is up and running. If the database is down due to any reason, such as a physical disk problem or a data corruption, flashback cannot rewind the database to any point of time anymore.

Because Oracle Flashback does not support backtracking (iteratively, back and forth), it may not have the problem of irrelevant time-base events (log records, anchor snapshots and checkpoints) due to backtracking because the irrelevant time-base events (historical data) are discarded. Further, since the historical data are discarded, Oracle Flashback may not have the problem of maintaining necessary events (e.g., log records and anchor snapshots), nor the problem of holding old log records for a long time due to backtracking.

Other existing distributed database products that support backtracking to a time in the past are mostly based on backup and restore. Backup and restore is the traditional way to have a database back to a state in past, which may be slow (e.g., could take hours for a large database). For example, GaussDB (for MySQL) is currently applicable to the generic Point-in-time Recovery (PITR) solution with backup and restore. With backup and restore, only the needed data may be loaded into the database instance, from the backup imagines, which would be managed outside the database instance itself. Thus, inside the database instance, one or more problems due to backtracking described herein may not be present.

According to an aspect, systems, methods and apparatus are provided for identifying and organizing relevant events (e.g., log records, anchor snapshots and checkpoints) for database states, for reconstructing a database state as of a timepoint in the past. Such systems, methods and apparatus may allow for identifying relevant events for backtracking thereby avoiding the problem of irrelevant events due to backtracking as described herein.

According to another aspect, systems, methods and apparatus are provided for maintaining minimum set of necessary events (e.g., log records, anchor snapshots and checkpoints) for reconstructing a database state as of a timepoint in the past, within a given time window. Such systems, methods and apparatus may allow for maintaining the necessary events to support backtracking within the backtracking window and when shifting the backtracking window. Systems, methods and apparatus described herein may further obviate the need to hold events for long periods of time due to backtracking new start.

Systems, methods and apparatus described herein may further allow for reconstructing a correct database state for any time in the past, back and forth iteratively, within the database instance itself. Systems, methods and apparatus described herein may further allow for maintaining the backtracking window size, with reduced or minimal storage cost.

One or more embodiments described herein may apply to database backtracking architecture of distributed database systems as described herein in reference to FIG. 1 and FIG. 2. Such database backtracking architecture or database backtracking involves using one or more events (e.g., log records, snapshots and/or recovery checkpoints) to backtrack a database to a target timepoint or LSN.

One or more embodiments may provide systems, methods and apparatus to identify and organize relevant events when backtracking. These systems, methods and apparatus may further provide for maintaining minimum set of necessary events for supporting backtracking.

According to an aspect, a method may be provided for identifying and organizing relevant events including one or more of: log records, anchor snapshots and checkpoints. In some embodiments, the log records, anchor snapshots and recovery checkpoints occur in time order, each of which may be referred to as a time-based event.

In some embodiments, each set of the time-based events forms a time sequence. For example, log records form the log record time sequence, and checkpoints form checkpoint time sequence. In some embodiments, events of a time sequence are appended to a storage in time order, strictly. Each event has a storage offset (or offset).

In some embodiments, for each database state, the relevant events (e.g., relevant log records) are organized naturally with LSN ranges, and for each time sequence, the relevant events are organized naturally with offset ranges.

In some embodiments, for each database state, among many backtrackings, the relevant events then can be identified by the relevant LSN ranges if the event has LSN info, and by relevant offset ranges of the time sequence.

In some embodiments, for a time sequence, when appending the events to the storage, there may be some out-of-time-order events (not in time order strictly). In such circumstances, the relevant offset ranges may still be used to read the events, but the relevant LSN ranges may need to be used to filter out the out-of-time-order irrelevant events. This may require the event to have an LSN information and the offset range contain all the relevant events for the corresponding LSN ranges.

In some embodiments, there may be other time sequences besides those mentioned herein as may be appreciated by a person skilled in the art. For example, other time sequences may include those for Page to Slice mapping info. These other time sequences may be handled in the same way as described in one or more embodiments herein.

In some embodiments, the events of a time sequence are appended to several storage streams in parallel. In such embodiments, the storage offset can be a vector of the offsets of storage streams.

Referring to FIG. 3, the relevant LSN ranges and relevant offset ranges for recovery checkpoint time sequence, for database states of LSN from 3001 to 3500 may be as follows. The relevant LSN ranges: [0, 500], [2001, 2010], [3001, . . . ], and the relevant recovery offset ranges: [0, 40], [120, 120], [160, . . . ].

One or more embodiments may provide for generating the relevant LSN ranges and offset ranges for a database state.

Figure 6:
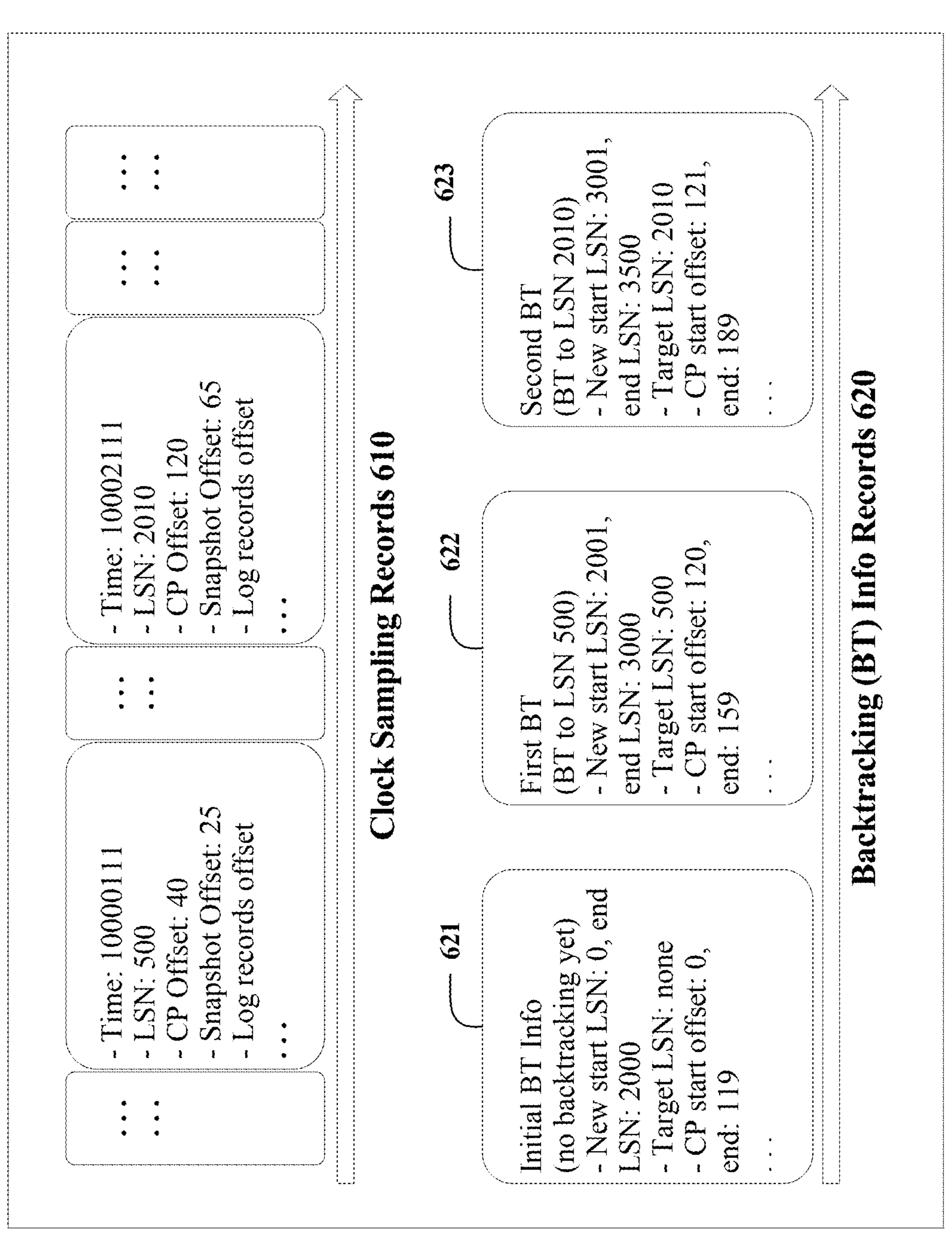
FIG. 6 illustrates clock sampling records and backtracking information records, according to an embodiment.

FIG. 6 illustrates clock sampling records and backtracking information records, according to an embodiment. In some embodiments, a database node (e.g., a central node such as the SQL master) performs clock sampling (e.g., information collection) periodically (e.g., every second) and clock sampling record 610 is generated periodically for backtracking. The periodicity of generating the clock sampling records may be similar to or different from the periodicity of collecting relevant information for generating the clock sampling records. In an embodiment, the information (info) collected include one or more of: a time, a corresponding LSN, and offsets of each of the time sequences. The time sequences may include one or more of: log records, anchor snapshot, and recovery checkpoint.

In some embodiments, the clock sampling records includes a list of clock sampling records, which provide or indicate timepoints to which the database can be backtracked, i.e., the backtracking targets. In an embodiment, a user selects a target time for backtracking the database. A corresponding target LSN indicated by the clock sampling records may be determined (identified or selected) that correspond to the target time selected by the user. Each clock sampling record of the clock sampling records 610 include one or more of: a time, a corresponding LSN, and offsets of each of the time sequences (log records, anchor snapshot, and recovery checkpoint).

In some embodiments, when performing a new backtracking, a new backtracking information record of the backtracking information records 620 is also generated at the central node such as an SQL master. In generating the new backtracking information record, in some embodiments, the SQL master records: the end LSN and the end offset of each time sequence to the last backtracking information record (e.g., the backtracking information record previous to or before the new backtracking information record). In some embodiments, the SQL master may further record one or more of the following to the new backtracking information record: the backtracking new start LSN, the new start offsets of the time sequences and the target LSN.

The illustrated backtracking information records 620 represents the backtracking information records for the backtrackings shown in FIG. 3. For example, the initial BT information record 621 correspond to an initial timeline 310 where no backtracking has yet occurred. For the initial timeline, the start LSN is 0 (i.e. backtracking is enabled at the beginning of operation) and the end LSN is 2000. Since no backtracking occurs, the target LSN is empty (none), and the CP start storage offset is 0 and CP end storage offset is 119 as indicated by the recovery checkpoint storage offset information in the FIG. 3. The first BT information record 622 correspond to first backtracking 302 which is represented by the timeline 320. For the timeline 320, the new start LSN is 2001 (which is based on the end LSN of the previous timeline, e.g., the initial timeline having an end LSN of 2000) and the end LSN is 3000. The first backtracking target LSN is 500 as indicated in the first BT information record 622. The CP start storage offset is 120 (which is based on the CP end storage offset of the previous timeline, e.g., the initial timeline having a CP end storage offset of 119) and a CP end storage offset is 159. The same approach is taken for the second BT information record 623 which corresponds to timeline 330 corresponding to the second backtracking 303 to LSN 2010 from LSN 3000. For the second BT, CP start offset is 160 and end offset is 189.

Embodiments may provide for generating relevant LSN ranges and relevant offset ranges for database states. In some embodiments, with the backtracking information records 620 and the clock sampling records 610, the relevant LSN and Offset ranges can be generated for a database state.

According to an embodiment, the relevant LSN and offset ranges for a desired database state (e.g., state LSN or desired LSN) may be determined or generated. In an embodiment, at a first step, the LSN that identifies the desired database state (State LSN) is used to search the list of backtracking information records. If the state LSN is in a range of the start LSN and end LSN of a backtracking information record, then the base backtracking information record of the State LSN is found. A relevant LSN range can then be obtained as follows: [Base backtracking start LSN, State LSN].

In some embodiments, at the first step, if the State LSN is a backtracking Target LSN, i.e., the State LSN is in a clock sampling record, then a relevant offset range for a time sequence can be obtained as follows: [Base backtracking start offset, offset corresponding to the Target LSN in the clock sampling record]. Otherwise (i.e., if the State LSN is not a backtracking Target LSN, or the State LSN is not in a clock sampling record), then, the relevant offset range may be determined as follows: [Base backtracking start offset, None], where "None" indicates an indefinite value or indefinite storage offset value. Such an indefinite value indicates that the range extends to current time or to current storage end which would be in growing (in lasting).

In some embodiments, at a second step, if the backtracking information record of the base backtracking has a Target LSN, then, the Target LSN is used as the State LSN similar to the first step, to find the Base backtracking of the Target LSN. Once the base backtracking of the Target LSN is determined, then a relevant LSN range may be determined as follows: [Base backtracking start LSN, the Target LSN]. In some embodiments, at the second step, a relevant offset range may be obtained as follows: [Base backtracking start offset, offset corresponding to target LSN in the clock sampling record].

In some embodiments, the second step is performed continuously or iteratively until the base backtracking information record does not have (or lacks) a target LSN (e.g., being the initial BT information record) or there is no base backtracking information record that can be determined. After this, the relevant LSN ranges and offset ranges are generated or obtained for the desired state (State LSN).

In some embodiments, with the relevant LSN ranges and the relevant offset ranges, the relevant events (log records, anchor snapshots, and recovery checkpoints) can be identified. Based on the relevant events, the database state can be reconstructed on backtracking or recovered on crash recovery, appropriately.

In some embodiments, instead of using relevant LSN and offset ranges, a backtracking ID can be used to denote each event, and the desired state can be obtained accordingly. In some cases, this approach may not be costly and not as efficient since there could be large amount of log records. However, for less frequent events, backtracking ID denotation may allow for an efficient approach.

As may be appreciated, there may be other approaches to organizing events and obtaining a desired database state. For example, timeline ID, version, group ID, and any other appropriate method of organizing events for obtaining a desired database state.

In some embodiments, database timelines or timelines may be used to generate the relevant LSN and offset ranges for a desired database state. A database timeline may refer to a coordinate to describe consistent database states evolving in time order.

According to an embodiment, when performing a backtracking to a target LSN, a new timeline is formed, from a base timeline. In some embodiments, each timeline has a unique ID. In some embodiments, a new timeline inherits the relevant time-based events from base timeline, as well as inherits the relevant LSN and offset ranges from the base timeline. In some embodiments, the backtracking information record 620 may be referred to as timeline information records.

Figure 7:
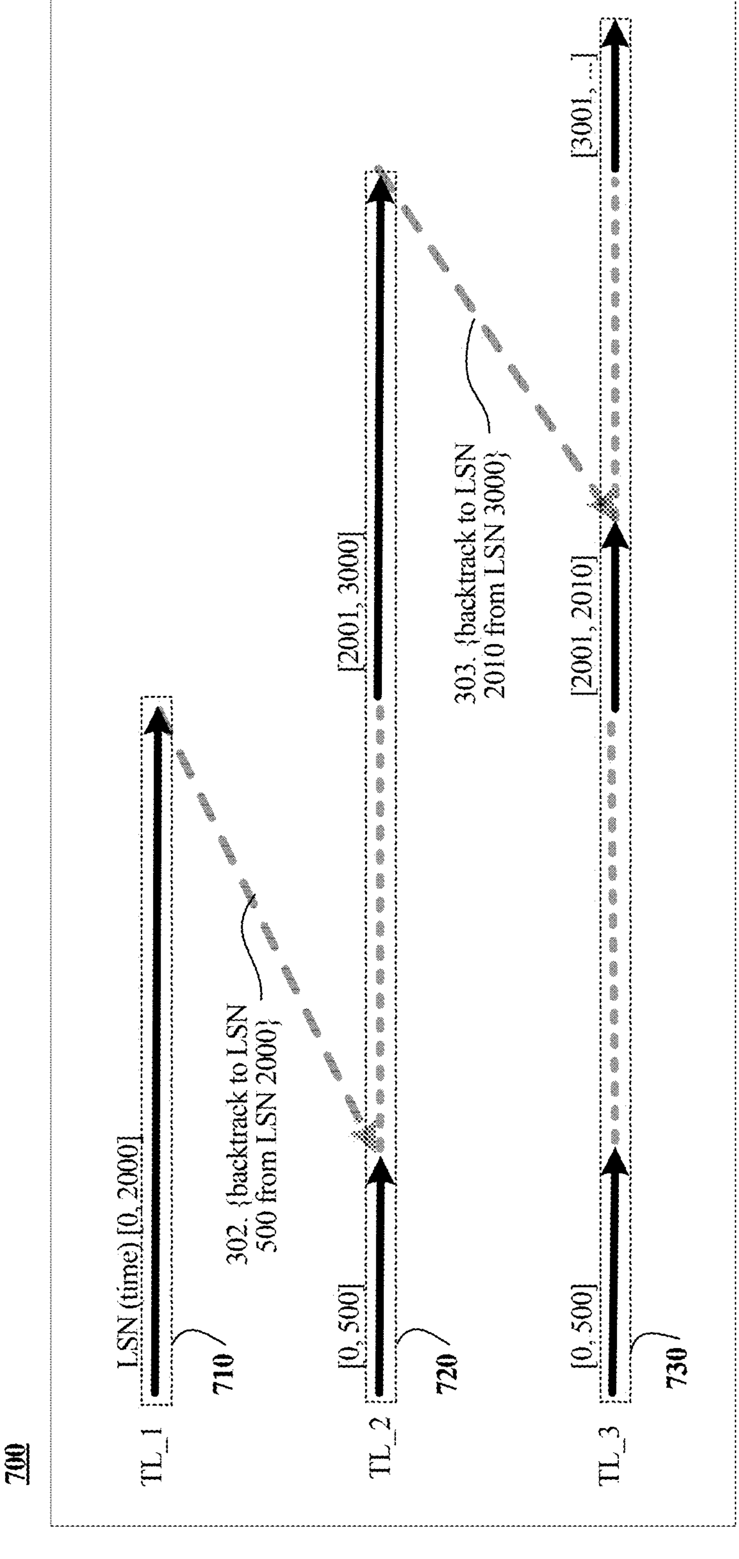
FIG. 7 illustrates a set of timelines, according to an embodiment.

In an embodiment, the set of timelines 700 organizes the events based on backtrackings to obtain a desired state of a database. FIG. 7 illustrates a set of timelines, according to an embodiment. The set of timelines 700 are based on the backtrackings 302 and 303 of FIG. 3. The set of timelines 700 includes a first timeline or an initial time 710, denoted as TL_1, a second timeline 720, denoted as TL_2 and is based on a first backtracking 302, and a third timeline 303, denoted as TL_3 and is based on the second backtracking 303.

As an example, referring to FIG. 3 and FIG. 7, the backtracking 302 to LSN 500 forms the second timeline TL_2 720 from the base timeline, e.g., the first timeline TL_1 710. The second timeline TL_2 720 inherits the relevant time-based events from the base timeline TL_1 710, as well as inherits the relevant LSN and offset ranges from the base timeline TL_1 710. Similarly, the backtracking 303 to LSN 2010, forms the third timeline TL_3 730, from the base timeline TL_2 720. The third timeline TL_3 730 inherits the relevant time-based events from the base timeline TL_2 720, as well as inherits the relevant LSN and offset ranges from the base timeline TL_2 720.

In an embodiment, on each timeline, the relevant events of the time sequences are identified with relevant LSN ranges globally, and with relevant offset ranges of a time sequence, for the events in the time sequence itself locally. According to an embodiment, at a particular time, the distributed database system is running on a specific timeline only and forms a database state on the timeline, with the relevant events organized with relevant LSN and offset ranges. On the same timeline, the database states are consistent, but may conflict with the database states on other timelines.

Based on the set of timelines 700, relevant LSN ranges and offset ranges for a database state (e.g., a desired database state to which a database can backtrack) may be obtained and the database state can be reconstructed.

Embodiments described herein may identify or determine relevant events for a desired database state, and therefore resolve the problem of irrelevant events.

In some embodiments, based on the set of timelines 700, the relevant events for each timeline are determined based on said each timeline. For the example, in FIG. 3, if SQL Master crashed at LSN 3002, then the relevant recovery checkpoint, CP 1, may be obtained and loaded. Thereafter, log records in the relevant LSN ranges [0, 500], [2001, 2010] and [3001, 3002] may be re-applied.

In an embodiment, for backtracking to LSN 2010, for slice 1-1, the appropriate anchor snapshot, anchor 1 (LSN 100) is obtained and loaded. Thereafter, the log records in the relevant LSN ranges is re-applied.

In some embodiments, with the obtained relevant storage offset ranges, performance may be improved based on reading the relevant events from storage, by jumping between the relevant offset ranges, i.e., skipping the reading of the irrelevant events. In some cases, between two relevant storage offset ranges, there may be irrelevant events for very long time, e.g., 79 hours for a backtracking window of 80 hours. In some cases, with a heavy workload, there may be a large volume of log records (e.g., tens Terabytes) accumulated in 79 hours. Accordingly, embodiments may improve performance based on obtaining one or more of: relevant LSN and offset ranges.

Embodiments may further provide for maintaining the necessary events for supporting backtracking within the backtracking window. Embodiments may further provide for maintaining the necessary events for supporting backtracking when shifting the backtracking window so that the database can successfully backtrack to one or more time-points indicated by the backtracking window.

In some embodiments, the protection or truncation offsets of related time sequences (of log records, anchor snapshots and recovery checkpoints) are calculated, and then the events in the time sequences before the protection offsets can be truncated (deleted from the storage). Accordingly, only the necessary events for the backtracking window are kept and maintained.

In some embodiments, a background thread in the central node, such as an SQL master, shifts the backtracking window front periodically (e.g., every 20 minutes or hourly). For example, as shown in and described herein in reference to FIG. 4, at a particular time, the background thread shifts 404 the backtracking window front from LSN 50 to a new front LSN of 300.

In some embodiments, when shifting the backtracking window, the new backtracking window front LSN (e.g., LSN 300) is used as a backtracking target LSN to find the first event of each related time sequences, i.e., the event of the smallest offset of the time sequence that is needed for backtracking to the target LSN. In some embodiments, determining or finding the protection/truncation offsets of all the related time sequences (including the event of the smallest offset of the time sequence(s)) may allow for identifying the earliest events that are needed to be maintained for supporting backtracking, and any event(s) before these earliest events are no longer needed for supporting backtracking within the backtracking window.

Embodiments may provide a method for shifting backtracking window or performing backtracking window shifting. According to an embodiment, the method includes, the SQL master computing a new backtracking window front LSN based on the clock sampling records. The method further includes, the SQL master using the front LSN as a target LSN for performing one or more operations.

In some embodiment, the method further includes, the SQL master obtaining, from each slice of all the slices of the database, an LSN of the slice anchor snapshot that need to be loaded for backtracking said each slice to the target LSN.

In some embodiments, the method further includes, with LSNs obtained from all the slices, the SQL master computing the smallest offset (i.e., protection offset) of the time sequences (referring to one or more time-based events, where an event is a log record, anchor snapshot or a recovery checkpoint) on the base timeline of the target LSN. Thus, protection offset of log records, anchor snapshot, and/or recovery checkpoint may be obtained at the SQL master for backtracking to the target LSN using the base timeline of the target LSN.

In some embodiments, the method further includes the SQL master computing or determining the smallest offset for the clock sampling records based on one or more of: the protection offsets of the time sequences computed and the LSNs obtained from the slices.

In some embodiments, the method further includes, the SQL master changing, updating or shifting the backtracking window front LSN to the new LSN (e.g., LSN 300). In some embodiments, the method further includes the SQL master truncating clock sampling records. The truncating may be based on the window front LSN. For example, the clock sampling records with LSN less than the window front LSN can be removed/truncated. In some embodiments, the method further includes the SQL master updating the backtracking information records. Such updating may include updating the New Start LSN and the Start Offsets of the time sequences, as recorded in the base backtracking info record (of the base timeline) of the Window Front LSN as target LSN, based on the windows front LSN and protection/truncation offsets of the time sequences. In some embodiments, the method further includes the SQL master persisting the changes.

In some embodiments, the method further includes the SQL master truncating the time sequences used by backtracking, by removing the events before the protection offsets as computed. In some embodiments, the method further includes the SQL master broadcasting the new backtracking window front to all the slices.

In some embodiments, the method further includes each slice, upon receiving the new backtracking window front LSN and setting the new backtracking window front LSN as a target LSN, finding or determining the anchor snapshot needed for backtracking said each slice to the target LSN. In some embodiments, the method further includes said each slice truncating one or more anchor snapshots based on the determined anchor snapshot needed for backtracking said each slice to target LSN. In some embodiments, the one or more truncated anchor snapshot refer to one or more anchor snapshots before (e.g., generated before, having lower LSN than) the determined anchor snapshot. In some embodiments, the method further includes said each slice releasing data held by the truncated one or more anchor snapshots.

Embodiments may further provide for maintaining the minimal set of events necessary for supporting backtracking within the backtracking window. By maintaining the minimal set of events necessary, embodiments may mitigate or obviate the need for holding events (e.g., log records) for a long time due to backtracking new start (e.g., timeline new start) as described herein in reference to FIGS. 5A and 5B.

Figure 8:
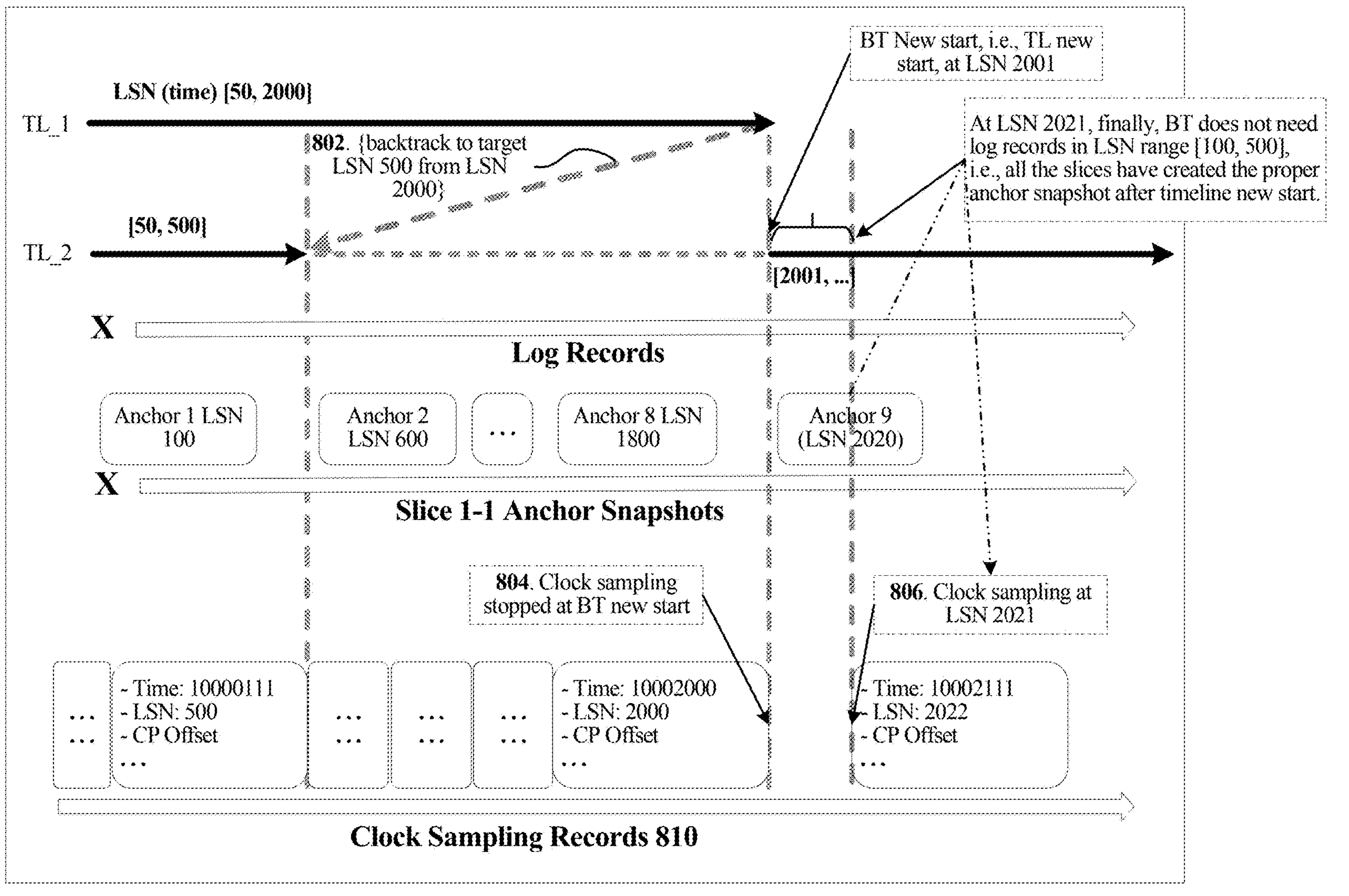
FIG. 8 illustrates handling of backtracking new start to maintain minimal set of events necessary for backtracking window, according to an embodiment.

FIG. 8 illustrates handling of backtracking new start to maintain minimal set of events necessary for backtracking window, according to an embodiment. As described herein, clock sampling records 610 and 810 indicate or provide the timepoints (i.e., backtracking targets) for backtracking. In an embodiment, before performing backtracking, the clock sampling is stopped (e.g., by or at an SQL master). For example, referring to FIG. 8, before performing backtracking 802 to LSN 500 from LSN 2000, clock sampling is stopped 804 (e.g., one or more operations involved in generating the clock sampling records are stopped). Then, after the backtracking New Start (BT new start (LSN 2001)), only when the old events on the base timeline (e.g., in LSN range [101, 500]) are not needed in future for backtracking, the clock sampling starts. For example, after the backtracking new start, at LSN 2021 is when the old events on the base timeline (e.g., events in LSN range [100, 500] in base timeline being TL_1) are no longer needed for backtracking. At this point, e.g., at LSN 2021, the clock sampling resumes 806.

Accordingly, the backtracking targets as indicated by the clock sampling records, may not need the old events on the base timeline.

According to an embodiment, a method is provided to determine the time at which old events on a base timeline are no longer needed. The method includes, after loading anchor snapshot and re-applying the old log records on base timeline (as part of the backtracking process, and to obtain the target LSN), the SQL master sending a request to each slice to generate one or more anchor snapshots. In some embodiments, the request may indicate to generate the one or more anchor snapshots immediately.

In some embodiments, the method further includes the SQL master obtaining or receiving, from said each slice, the LSN of the latest anchor snapshot. In some embodiments, the method further includes the SQL master checking or determining whether the old events (e.g., one or more of log record, anchor snapshot and recovery checkpoint) on the base timeline are still needed for backtracking based on the received LSN of the latest anchor snapshot from each slice. In some embodiments, the method further includes, checking, by the SQL master, continuously (repeatedly or iteratively) whether the old events on base timeline are still needed for backtracking based on the LSN of the latest anchor snapshot received from said each slice until the old events are not needed anymore.

One or more embodiments may avoid or mitigate the need to maintain records of old events in the database for a long time. Embodiments may allow for maintaining a reduced or minimal set of the necessary events for the backtracking window. Embodiments may further improve the likelihood or ensure that a database can backtrack to all timepoints indicated by the backtracking window, as sampled by the clock sampling.

In some embodiments, the backtracking functionality or feature of a database described according to one or more embodiments herein can be dynamically enabled or disabled. In some embodiments, the backtracking feature can be re-enabled after disabling. The backtracking feature refers to one or more embodiments described herein including organizing and identifying relevant events, shifting backtrack window, and maintaining minimum necessary events for supporting backtracking in the backtracking window.

In some embodiments, to enable the backtracking feature, a user sets the backtracking window size and activates or enables the backtracking feature, via for example, clicking an Enable Button on a user interface (UI) of the management console. In some embodiments, to enable the backtracking feature, the user directly issues the enable command to the SQL master with a backtracking window size of a non-zero positive value.

In some embodiments, the SQL master initializes the backtracking information record and then sends an enable command to all slices. In some embodiments, each slice, upon receiving the enable command, generates or creates a first anchor snapshot. Then, the SQL master checks with all the slices to determine whether proper anchor snapshots have been created. In some embodiments, when or if all the anchor snapshots are created, then the SQL Master starts the clock sampling operations, providing the backtracking target timepoints to the user.

In some embodiments, to disable the backtracking feature, a user disables or deactivates the backtracking feature by, for example, clicking a Disable Button on the UI of the management console. In some embodiments, to disable the backtracking feature, the user directly issues a Disable Command to the SQL master. In some embodiments, the SQL master then checks if the old events on the base timeline (e.g., events in LSN range [100, 500] as shown in FIG. 4) are still needed for crash recovery. In some embodiments, if old events are still needed, the SQL master waits until the old events are not needed anymore.

In some embodiments, if the old events are not needed (e.g., normal case), the SQL master further truncates the events of old timelines from the related time sequences, e.g. only keep the events of the current timeline from timeline new start. In some embodiments, the SQL master further sends a Disable Commands to all slices. In some embodiments, upon receiving the Disable Command, each slice deletes all the anchor snapshots and only keeps the data for the current timeline. In some embodiments, the SQL master subsequently deletes all the clock sampling records and the backtracking information records.

Embodiments may provide methods of identifying and organizing relevant events (e.g., log records, anchor snapshots, recover checkpoints, etc.) for database states and for reconstructing a database state as of a timepoint in the past. Embodiments may further solve the problem of irrelevant events (also the time paradox problem described herein) caused by backtracking. Embodiments may further allow for reconstructing a database state within a distributed database itself, back and forth iteratively and correctly (referring to backtracking functionality). Embodiments may further allow for correctly recovering a final or desired database state.

As may be appreciated, based on the organization of the relevant events, such as organizing relevant events based on timelines (or versioned branches, parallel universe, etc.), according to some embodiments, the backtracking window can be shifted and backtracking feature can be disabled and enabled dynamically. In some embodiments, with the relevant offset ranges obtained, when reading events (e.g., log records) from the storage, the reader can jump over or skip irrelevant events (irrelevant offset ranges) and read only the relevant events (relevant offset ranges). For example, if a user backtracks the database to 70 hours ago, there may be 70 hours of irrelevant log records (possibly, tens of terabytes) that can be skipped for reading according to one or more embodiments.

Embodiments may further provide methods for maintaining a reduced or minimum set of necessary events for a given backtracking window. Embodiments may further allow for keeping only the necessary events for the backtracking window, even when performing backtracking window shifting. Embodiments may further provide for maintaining minimal set of necessary events based on handling of the backtracking or timeline new start as described herein.

In some embodiments, the backtracking window can be shifted evenly and gradually e.g. to facilitate cleaning out un-necessary records/events evenly and gradually). In some embodiments, a reduced or a minimal set of events are maintained in the database system for supporting backtracking in the backtracking window and when shifting backtracking window.

Embodiments may further allow the needed storage size to remain near constant after backtracking over the backtrack window size (e.g., window size 80 hours, and backtrack to 79 hours ago at hour 81) or after many backtrackings. Embodiments may further provide for supporting heavy workload while maintaining minimum necessary events for supporting backtracking. Embodiments may further avoid the needed storage size from increasing or doubling.

Embodiments may further inhibit or avoid the window size from dramatically changing e.g., to reduce storage consumption. Accordingly, embodiments may improve storage utilization and consumption. Embodiments may further allow for dynamically (without shutting down the database) enabling and disabling the backtracking feature of the database. According, in some embodiments, the backtracking feature can be enabled, disabled and then enabled again dynamically (without shutting down the database).

Figure 9:
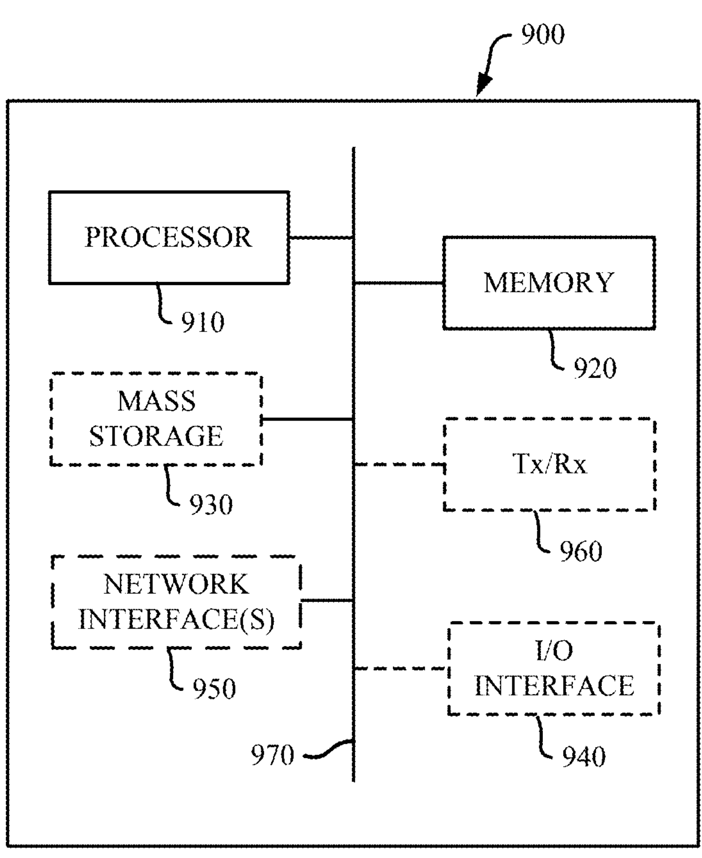
FIG. 9 illustrates an apparatus that may perform any or all of operations of the above methods and features explicitly or implicitly described herein, according to different aspects of the present disclosure.

FIG. 9 illustrates an apparatus 900 that may perform any or all of operations of the above methods and features explicitly or implicitly described herein, according to different aspects of the present disclosure. For example, a computer equipped with network function may be configured as the apparatus 900. In some aspect, apparatus 900 can be a device that connects to the network infrastructure over a radio interface, such as a mobile phone, smart phone or other such device that may be classified as user equipment (UE). In some aspects, the apparatus 900 may be a Machine Type Communications (MTC) device (also referred to as a machine-to-machine (m2m) device), or another such device that may be categorized as a UE despite not providing a direct service to a user. In some embodiments, apparatus 900 may perform one or more operations in one or more embodiments described herein. For example, the apparatus 900 may be one or more of: a database or a storage node, a master node (e.g., SQL master), a replica node, a log store node, a page store node, a database module or component, a slice abstract layer (SAL) or SAL node, an SAL query language module, a slice manager, and the like according to one or more aspects described herein.

As shown, the apparatus 900 may include a processor 910, such as a Central Processing Unit (CPU) or specialized processors such as a Graphics Processing Unit (GPU) or other such processor unit, memory 920, non-transitory mass storage 930, input-output interface 940, network interface 950, and a transceiver 960, all of which are communicatively coupled via bi-directional bus 970. Transceiver 960 may include one or multiple antennas According to certain aspects, any or all of the depicted elements may be utilized, or only a subset of the elements. Further, apparatus 900 may contain multiple instances of certain elements, such as multiple processors, memories, or transceivers. Also, elements of the hardware device may be directly coupled to other elements without the bi-directional bus. Additionally, or alternatively to a processor and memory, other electronics or processing electronics, such as integrated circuits, application specific integrated circuits, field programmable gate arrays, digital circuitry, analog circuitry, chips, dies, multichip modules, substrates or the like, or a combination thereof may be employed for performing the required logical operations.

The memory 920 may include any type of non-transitory memory such as static random-access memory (SRAM), dynamic random-access memory (DRAM), synchronous DRAM (SDRAM), read-only memory (ROM), any combination of such, or the like. The mass storage element 930 may include any type of non-transitory storage device, such as a solid-state drive, hard disk drive, a magnetic disk drive, an optical disk drive, USB drive, or any computer program product configured to store data and machine executable program code. According to certain aspects, the memory 920 or mass storage 930 may have recorded thereon statements and instructions executable by the processor 910 for performing any method operations described herein.

The processor 910 and memory 920 may function together as a chipset which may be provided together for installation into wireless communication apparatus 900 in order to implement WLAN functionality. The chipset may be configured to receive as input data including but not limited to PPDUs from the network interface 950. The chipset may be configured to output data including but not limited to PPDUs to the network interface 950.

FIG. 10 illustrates a method for identifying relevant events for backtracking a database, according to an embodiment. The method 1000 is performed by a distributed database system. The method 1000 includes performing 1001 at least one backtracking of a database, where each backtracking reverts the database to a respective target timepoint. The method further includes determining 1002 a desired state of the database to reconstruct after the at least one backtracking. The method further includes determining 1003, based on the at least one backtracking, one or more of a set of relevant log sequence number (LSN) ranges and a set of relevant storage offset ranges to reconstruct the database to the desired state. The method further includes 1004 reconstructing the database to the desired state based on the one or more of the set of relevant LSN ranges and the set of relevant storage offset ranges.

In some embodiments, the method further includes periodically generating clock sampling records. Each clock sampling record indicates a time point to which the database can be reconstructed. Each clock sampling record includes an LSN corresponding to the time point, and a storage offset of one or more events. Each event can be: a log record, an anchor snapshot, or a recovery checkpoint. In some embodiments, the method further includes generating backtracking information records based on the at least one backtracking.

In some embodiments, generating backtracking information records includes generating a set of backtracking information records based on a time order. Each backtracking information record of the set of backtracking information records indicates a respective LSN range and further indicates one or more of: a start LSN of the respective LSN range, an end LSN of the respective LSN range, a start storage offset of an event corresponding to the start LSN of the respective LSN range, and an end storage offset of the event corresponding to the end LSN of the respective LSN range. The event may be a log record, an anchor snapshot, or a recovery checkpoint. The set of backtracking information records includes an initial backtracking information record. The respective start LSN is based on when a backtracking feature of the distributed database system is activated. The respective end LSN is based on when a first backtracking of the at least one backtracking is performed. The set of backtracking information records includes at least one backtracking information record corresponding to the at least one backtracking. Each backtracking information record further indicates a target LSN of the corresponding target timepoint to which the database backtracked. For each backtracking information record, the respective start LSN is based on the end LSN of a previous backtracking information record as determined based on the time order. The respective end LSN of each backtracking information record is based on when a next backtracking is performed.

In some embodiments, the above-mentioned determining, based on the at least one backtracking, the one or more of the set of relevant LSN ranges and the set of relevant storage offset ranges to reconstruct the database to the desired state includes the following: determining, from the set of backtracking information records, a first base backtracking information record of a set of base backtracking information records based on the respective LSN range that includes a desired LSN. The desired LSN corresponds to the desired state. The backtracking information records includes the set of base backtracking information records. The above-mentioned determining may further include determining a relevant LSN range of the set of relevant LSN ranges based on a start LSN of the first base backtracking information record and the desired LSN. The above-mentioned determining may further include, for each event of one or more events associated with the first base backtracking information record, determining a relevant storage offset range of the set of relevant storage offset ranges based on a start storage offset of that event of the first base backtracking information record and a storage offset value of that event corresponding to the desired LSN. When the desired LSN is a target for backtracking, one of the clock sampling records corresponds to the desired LSN, and the storage offset value of the event corresponding to the desired LSN is a storage offset value of the event in the clock sampling record corresponding to the desired LSN. Otherwise, for example, in the case of recovery, the storage offset value of the event corresponding to the desired LSN is an indefinite storage offset value. Each event of the set of events is a log record, an anchor snapshot, or a recovery checkpoint.

In some embodiments, the method further includes, beginning from the first base backtracking information record, for each base backtracking information record of the set of base backtracking information records that indicates a target LSN, performing the following action: Determining, from the backtracking information records, a subsequent base backtracking information record of the set of base backtracking information records based on a corresponding LSN range that includes the target LSN of the base backtracking information record. The method may further include determining another relevant LSN range of the set of relevant LSN ranges based on a start LSN of the subsequent base backtracking information record and the target LSN of the base backtracking information record. The method may further include, for each event of one or more events associated with the subsequent base backtracking information record, determining another storage offset range of the set of relevant storage offset ranges based on a start storage offset of said event of the subsequent base backtracking information record and a storage offset value of said event in a clock sampling record corresponding to the target LSN of the base backtracking information record.

In some embodiments, reconstructing the database to the desired state based on the one or more of the set of relevant LSN ranges and the set of relevant storage offset ranges includes determining one or more events for reconstructing the database based on the one or more of the set of relevant LSN ranges and the set of relevant storage offset ranges. The database is then reconstructed based on the one or more events determined for reconstructing the database.

In some embodiments, the method further includes generating a set of timelines based on a time order. Each timeline indicates a set of LSN ranges and a set of storage offset ranges for an event based on the set of the LSN ranges. The event may be a log record, an anchor snapshot, or a recovery checkpoint. The set of timelines includes an initial timeline indicating a respective last LSN range having a start LSN based on when a backtracking feature of the distributed database system is activated. The respective last LSN range of the initial timeline has an end LSN of when a first backtracking of the at least one backtracking is performed. The set of timelines includes at least one timeline corresponding to the at least one backtracking. Each timeline of this at least one timeline corresponds to a respective backtracking of the at least one backtracking and is associated with a respective target LSN corresponding to the target timepoint of the respective backtracking. A latest timeline of the at least one timeline corresponds to a current timeline associated with a latest backtracking of the at least one backtracking. The current timeline indicates a respective last LSN range with an end LSN being based on when a next backtracking is performed after the at least one backtracking. Each timeline of the at least one timeline indicates a respective set of LSN ranges. The set of LSN ranges includes a respective last LSN range with a start LSN based on an end LSN of a previous timeline. The previous timeline is determined according to the time order. The last LSN range ends based on an LSN of when a next backtracking is performed. The set of LSN ranges includes one or more pertinent LSN ranges determined from a set of LSN ranges of a corresponding base timeline. The corresponding base timeline is determined from the set of timelines and includes in its last LSN range the respective target LSN of said each timeline of the at least one timeline. The one or more pertinent LSN ranges includes all LSN ranges up to a last pertinent LSN range. The last pertinent LSN range ends at the respective target LSN of each timeline of the at least one timeline.

In some embodiments, the above-mentioned determining, based on the at least one backtracking, of the one or more of the set of relevant LSN ranges and the set of relevant storage offset ranges to reconstruct the database to the desired state, includes the following: A target timeline from the set of timelines is determined based on a respective last LSN range that includes a desired LSN. The desired LSN corresponds to the desired state. The set of relevant LSN ranges are determined based on all LSN ranges of the target timeline up to a last relevant LSN range. The last relevant LSN range ends at the desired LSN. The set of relevant storage offset ranges is determined based on a set of storage offset ranges corresponding to the determined set of relevant LSN ranges.

FIG. 11 illustrates a method of maintaining a minimum set of time-based events for supporting backtracking, according to an embodiment. The method 1100 may allow for maintaining a reduced or a minimum set of events for supporting backtracking within a backtracking window to void holding events for longer than a retention threshold (e.g., 3 days). The method may be performed by a distributed database system. The method includes generating 1101 clock sampling records indicating a backtracking window via one or more time points to which a database can be backtracked. The method further includes performing 1102 at least one backtracking of the database. Each backtracking backtracks the database to a target timepoint. The method further includes, for each backtracking of the at least one backtracking: pausing 1103 the generation of the clock sampling records; backtracking the database to the corresponding target timepoint; and resuming the generation of the clock sampling records following the backtracking.

In some embodiments, the method further includes generating a set of backtracking information records based on a time order. Each backtracking information record of the set of backtracking information records indicates a respective LSN range and further indicates one or more of: a start LSN of the respective LSN range, an end LSN of the respective LSN range, a start storage offset of an event corresponding to the start LSN of the respective LSN range, and an end storage offset of the event corresponding to the end LSN of the respective LSN range. The event may be a log record, an anchor snapshot, or a recovery checkpoint. The set of backtracking information records includes an initial backtracking information record, where the respective start LSN is based on when a backtracking feature of the distributed database system is activated. The respective end LSN is based on when a first backtracking of the at least one backtracking is performed. The set of backtracking information records includes at least one backtracking information record corresponding to the at least one backtracking. Each backtracking information record further indicates a target LSN of the corresponding target timepoint to which the database is backtracked. For each such backtracking information record, the respective start LSN is based on the end LSN of a previous backtracking information record as determined based on the time order. The respective end LSN of each backtracking information record is based on when a next backtracking is performed.

In some embodiments, for each backtracking of the at least one backtracking, after pausing and before resuming the generation of the clock sampling records, the method further includes requesting each slice of the database to generate at least one anchor snapshot; and receiving an indication from said each slice of the database that the anchor snapshot has been generated.

In some embodiments, the method further includes generating a set of timelines based on a time order. Each timeline indicates a set of LSN ranges and a set of storage offset ranges for an event based on the set of the LSN ranges. The event may be a log record, an anchor snapshot, or a recovery checkpoint. The set of timelines includes an initial timeline indicating a respective last LSN range having a start LSN based on when a backtracking feature of the distributed database system is activated. This last LSN range of the initial timeline has an end LSN of when a first backtracking of the at least one backtracking is performed. The set of timelines includes at least one timeline corresponding to the at least one backtracking. Each timeline corresponds to a respective backtracking and is associated with a respective target LSN corresponding to the target timepoint of the respective backtracking. A latest such timeline corresponds to a current timeline associated with a latest backtracking of the at least one backtracking. The current timeline indicates a respective last LSN range with an end LSN that is based on when a next backtracking is performed after the at least one backtracking. Each timeline indicates a respective set of LSN ranges including: a respective last LSN range with a start LSN based on an end LSN of a previous timeline. The previous timeline is determined according to the time order, and the last LSN range ends based on an LSN of when a next backtracking is performed. The set of LSN ranges further includes one or more pertinent LSN ranges determined from a set of LSN ranges of a corresponding base timeline. The base timeline is determined from the set of timelines and includes in its last LSN range the respective target LSN of the timeline associated with the set of LSN ranges. The one or more pertinent LSN ranges includes all LSN ranges up to a last pertinent LSN range. The last pertinent LSN range ends at the respective target LSN of the timeline associated with the set of LSN ranges.

In some embodiments, for each backtracking of the at least one backtracking, after pausing and before resuming the generation of the clock sampling records, the method further comprises: requesting each slice of the database to generate an anchor snapshot; and receiving an indication from said each slice of the database that the anchor snapshot has been generated.

According to an aspect of the present disclosure, there is provided another method for maintaining events necessary for supporting backtracking within a backtracking window. The method may be performed by a distributed database system. The method includes determining a desired time point from clock sampling records to set as an updated backtracking window front of a database. The backtracking window front indicates an earliest time point to which the database can be backtracked. Each clock sampling record indicates a respective timepoint to which the database can be backtracked. Each said clock sampling record further includes an LSN corresponding to the respective timepoint and a storage offset of one or more events associated with the respective timepoint. Each event is a log record, an anchor snapshot, or a recovery checkpoint. The method further includes determining a truncation point for deleting one or more irrelevant or unnecessary events based on a desired LSN corresponding to the desired time point. The one or more irrelevant events refer to members of the one or more events which occurred before the truncation point. The method further includes truncating the one or more irrelevant events by deleting the one or more irrelevant events.

In some embodiments, the method further includes setting the updated backtracking window front to a truncation clock sampling record of the clock sampling records by deleting one or more clock sampling records of the clock sampling records appearing before the truncation clock sampling record. The truncation clock sampling record indicates the desired time point.

In some embodiments, where the truncation point is: a particular LSN; or a storage offset of the one or more events, the determining of the truncation point includes determining the particular LSN based on a truncation anchor snapshot needed to backtrack the database to a desired state corresponding to the desired timepoint. The determining of the truncation point may further include determining the truncation storage offset of the one or more events needed to backtrack the database to the desired LSN based on the truncation anchor snapshot.

In some embodiments, wherein the truncation point is the particular LSN, the method further includes obtaining a set of latest anchor snapshots from a set of slices of the database, where each latest anchor snapshot is an anchor snapshot with highest LSN needed for backtracking a corresponding slice of the set of slices to the desired LSN. In such embodiments, the truncation anchor snapshot is a latest anchor snapshot among the set of latest anchor snapshots with smallest LSN.

In some embodiments, where the truncation point is the storage offset of the one or more events, the method further includes obtaining a set of latest anchor snapshots from a set of slices of the database, wherein each latest anchor snapshot is an anchor snapshot with highest LSN needed for backtracking a corresponding slice of the set of slices to the desired LSN. In such embodiments, the method further includes obtaining, a set of storage offset values of log records needed to backtrack the set of slices to the desired LSN based on the set of latest anchor snapshots, wherein the truncation storage offset is a storage offset value among the set of storage offset values of log records with smallest value.

In some embodiments, the method for maintaining events necessary for supporting backtracking within a backtracking window further includes broadcasting the updated backtracking window front to the set of slices. In some embodiments, the method further includes truncating at each slice of the set of slices one or more anchor snapshots having LSNs less than an LSN of the corresponding latest anchor snapshot of the set of latest anchor snapshots for said slice.

In some embodiments, where the truncation point is one or more of: a lowest LSN value among a set of lower bound LSN values, and for each event of the one or more events, a lowest storage offset value from a set of lower bound storage offset values corresponding to said event, then the determining the truncation point further includes determining one or more of the set of lower bound LSN values and the set of lower bound storage offset values for the one or more events to backtrack the database to the desired state.

In some embodiments, the method further includes performing at least one backtracking of the database, wherein each backtracking reverts the database to a target timepoint. In some embodiments, the method further includes generating a set of backtracking information records based on a time order. Each backtracking information record of the set of backtracking information records indicates a respective LSN range and further indicates one or more of: a start LSN of the respective LSN range, an end LSN of the respective LSN range, a start storage offset of an event corresponding to the start LSN of the respective LSN range, and an end storage offset of the event corresponding to the end LSN of the respective LSN range. The event may be a log record, an anchor snapshot, or a recovery checkpoint. The set of backtracking information records includes an initial backtracking information record, where the respective start LSN is based on when a backtracking feature of the distributed database system is activated. The respective end LSN is based on when a first backtracking of the at least one backtracking is performed. The set of backtracking information records includes at least one backtracking information record corresponding to the at least one backtracking. Each backtracking information record further indicates a target LSN of the corresponding target timepoint to which the database is backtracked. For each such backtracking information record, the respective start LSN is based on the end LSN of a previous backtracking information record as determined based on the time order. The respective end LSN of each backtracking information record is based on when a next backtracking is performed.

In some embodiments, determining one or more of the set of lower bound LSN values and the set of lower bound storage offset values includes determining, from the set of backtracking information records, a first base backtracking information record of a set of base backtracking information records based on the respective LSN range that includes the desired LSN (i.e. the backtracking window front LSN), the set of backtracking information records including the set of base backtracking information records. In some embodiments, determining one or more of the set of lower bound LSN values and the set of lower bound storage offset values further includes determining a lower bound LSN value of the set of lower bound LSN values and updating the start LSN of the first base backtracking information record. In some embodiments, determining one or more of the set of lower bound LSN values and the set of lower bound storage offset values further includes for each event of the one or more events, determining a lower bound storage offset value of the set of lower bound storage offset values and updating the start storage offset of said event of the first base backtracking information record.

In some embodiments, the method further includes, beginning with the first base backtracking information record, deleting (truncating) all the backtracking info records having a start LSN less than the start LSN of the first base backtracking information record. See e.g. FIG. 6 which illustrates start LSN and CP start offset in this regard.

In some embodiments, the method further includes performing at least one backtracking of the database, wherein each backtracking reverting the database to a target timepoint. In some embodiments, the method further includes generating a set of timelines based on a time order. Each timeline indicates a set of LSN ranges and a set of storage offset ranges for an event based on the set of the LSN ranges. The event may be a log record, an anchor snapshot, or a recovery checkpoint. The set of timelines includes an initial timeline indicating a respective last LSN range having a start LSN based on when a backtracking feature of the distributed database system is activated. This last LSN range of the initial timeline has an end LSN of when a first backtracking of the at least one backtracking is performed. The set of timelines includes at least one timeline corresponding to the at least one backtracking. Each timeline of the at least one timeline corresponds to a respective backtracking and is associated with a respective target LSN corresponding to the target timepoint of the respective backtracking. A latest timeline of the at least one timeline corresponds to a current timeline associated with a latest backtracking of the at least one backtracking. The current timeline indicates a respective last LSN range with an end LSN that is based on when a next backtracking is performed after the at least one backtracking. Each timeline of the at least one timeline indicates a respective set of LSN ranges including: a respective last LSN range with a start LSN based on an end LSN of a previous timeline. The previous timeline is determined according to the time order, and the last LSN range ends based on an LSN of when a next backtracking is performed. The respective set of LSN ranges further includes one or more pertinent LSN ranges determined from a set of LSN ranges of a corresponding base timeline. The base timeline is determined from the set of timelines and includes in its last LSN range the respective target LSN of the timeline associated with the set of LSN ranges (e.g., said each timeline of the at least one timeline). The one or more pertinent LSN ranges includes all LSN ranges up to a last pertinent LSN range. The last pertinent LSN range ends at the respective target LSN of the timeline associated with the set of LSN ranges.

In some embodiments, determining one or more of the set of lower bound LSN values and the set of lower bound storage offset values includes determining a target timeline from the set of timelines based on a respective last LSN range that includes a desired LSN. The desired LSN corresponds to the desired timepoint. The target timeline updates its start LSN and offsets with the one or more of the set of lower bound LSN values and the set of lower bound storage offset values for each event of the one or more events. The timelines before the target time lines, if any, would be deleted.

According to an aspect of the present disclosure, there is provided another method for enabling the backtracking feature of a distributed database system. The method may be performed by a distributed database system. The method includes receiving a request to enable a backtracking feature of the database. The method further includes sending to each slice of the database a request to generate an anchor snapshot for supporting the backtracking feature of the database. The method further includes receiving an indication from each slice of the database that the anchor snapshot has been generated. The method further includes generating clock sampling records indicating a backtracking window via one or more timepoints to which the database can be backtracked.

In some embodiments, the clock sampling records are generated periodically and after receiving the indication from said each slice. Each clock sampling record indicates a time point to which the database can be reconstructed. Said each clock sampling record further includes an LSN corresponding to the time point, and a storage offset of one or more events. Each event can be a log record, an anchor snapshot, or a recovery checkpoint.

According to an aspect of the present disclosure, there is provided another method for disabling the backtracking feature of a distributed database system. The method may be performed by a distributed database system. The method includes generating clock sampling records for supporting a backtracking feature of a database. The clock sampling records indicate a backtracking window via one or more timepoints to which the database can be backtracked. The method further includes receiving a request at a deactivation time to disable the backtracking feature. The method further includes ceasing the generation of the clock sampling records based on the one or more events. The method further includes deleting one or more events based on the deactivation time, each event of the one or more events being a log record, an anchor snapshot or a recovery checkpoint.

In some embodiments, the method further includes performing at least one backtracking of the database, wherein each backtracking reverts the database to a target timepoint. In some embodiments, the method further includes generating a set of backtracking information records based on a time order. Each backtracking information record of the set of backtracking information records indicates a respective LSN range and further indicates one or more of: a start LSN of the respective LSN range, an end LSN of the respective LSN range, a start storage offset of an event corresponding to the start LSN of the respective LSN range, and an end storage offset of the event corresponding to the end LSN of the respective LSN range. The event may be a log record, an anchor snapshot, or a recovery checkpoint. The set of backtracking information records includes an initial backtracking information record, where the respective start LSN is based on when a backtracking feature of the distributed database system is activated. The respective end LSN is based on when a first backtracking of the at least one backtracking is performed. The set of backtracking information records includes at least one backtracking information record corresponding to the at least one backtracking. Each backtracking information record further indicates a target LSN of the corresponding target timepoint to which the database is backtracked. For each such backtracking information record, the respective start LSN is based on the end LSN of a previous backtracking information record as determined based on the time order. The respective end LSN of each backtracking information record is based on when a next backtracking is performed.

In some embodiments, the method further includes determining from the set of backtracking information records that a recovery of the database at the deactivation time is based on a set of events indicated via at least two backtracking information records of the backtracking information records. In some embodiments, the method further includes delaying the deleting of the clock sampling records until a recovery checkpoint is generated that supports the recovery of the database based on a second set of events indicated via a latest backtracking information record of the set of backtracking information records. The latest backtracking information record corresponds to the deactivation time. When backtracking is disabled, the clock sampling records may not be needed anymore and may be deleted during backtracking disabling. The clock sampling records may be used for performing the backtracking disabling.

In some embodiments, where the deleted one or more events are indicated via all backtracking information records prior to the latest backtracking information record, the method further includes: ceasing the generation of the backtracking information records based the deleted one or more events. All the backtracking information records may be deleted as the final step of the backtracking disabling, e.g. after deleting all the clock sampling records.

In some embodiments, the method further includes determining from the set of backtracking information records that a recovery of the database at the deactivation time is based on a set of events that is indicated via a latest backtracking information record corresponding to the deactivation time. The deleted one or more events are indicated via all backtracking information records prior to the latest backtracking information record.

In some embodiments, the method further includes sending to each slice of the database a request to disable the backtracking feature. In some embodiments, the method further includes deleting, by each slice of the database, all the anchor snapshots needed for supporting backtracking.

In some embodiments, the method further includes performing at least one backtracking of the database, wherein each backtracking reverting the database to a target timepoint. In some embodiments, the method further includes generating a set of timelines based on a time order. Each timeline indicates a set of LSN ranges and a set of storage offset ranges for an event based on the set of the LSN ranges. The event may be a log record, an anchor snapshot, or a recovery checkpoint. The set of timelines includes an initial timeline indicating a respective last LSN range having a start LSN based on when a backtracking feature of the distributed database system is activated. This last LSN range of the initial timeline has an end LSN of when a first backtracking of the at least one backtracking is performed. The set of timelines includes at least one timeline corresponding to the at least one backtracking. Each timeline of the at least one timeline corresponds to a respective backtracking and is associated with a respective target LSN corresponding to the target timepoint of the respective backtracking. A latest timeline of the at least one timeline corresponds to a current timeline associated with a latest backtracking of the at least one backtracking. The current timeline indicates a respective last LSN range with an end LSN that is based on when a next backtracking is performed after the at least one backtracking. Each timeline of the at least one timeline indicates a respective set of LSN ranges including: a respective last LSN range with a start LSN based on an end LSN of a previous timeline. The previous timeline is determined according to the time order, and the last LSN range ends based on an LSN of when a next backtracking is performed. The respective set of LSN ranges further includes one or more pertinent LSN ranges determined from a set of LSN ranges of a corresponding base timeline. The base timeline is determined from the set of timelines and includes in its last LSN range the respective target LSN of the timeline associated with the set of LSN ranges (e.g., said each timeline of the at least one timeline). The one or more pertinent LSN ranges includes all LSN ranges up to a last pertinent LSN range. The last pertinent LSN range ends at the respective target LSN of the timeline associated with the set of LSN ranges.

In some embodiments, the method further includes determining from the set of timelines that a recovery of the database at the deactivation time is based on a set of LSN ranges indicated via a timeline other than the current timeline. In some embodiments, the method further includes delaying the deleting of the clock sampling records until a recovery checkpoint is generated in the respective last LSN range of current timeline, wherein the deleted one or more events correspond to all timelines prior to current timeline and all LSN ranges of the current timeline other than the last LSN range.

In some embodiments, the method further includes determining from the set of timelines that a recovery of the database at the deactivation time is based on the last LSN range of the current timeline, wherein the deleted one or more events correspond to all timelines prior to the current timeline. Furthermore, in various embodiments, after disabling the backtracking feature, all timelines (e.g., the set of timelines) and the associated information including LSN and offset ranges are deleted. Since backtracking is disabled, then the set of timelines is no longer needed.

In some embodiments, the method further includes sending to each slice of the database a request to disable the backtracking feature. In some embodiments, the method further includes deleting, by each slice of the database, all anchor snapshots.

Aspects of the present disclosure can be implemented using electronics hardware, software, or a combination thereof. In some aspects, this may be implemented by one or multiple computer processors executing program instructions stored in memory. In some aspects, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method by a distributed database system, the method comprising:

performing at least one backtracking of a database, wherein each backtracking reverts the database to a respective target timepoint;

determining a desired state of the database to reconstruct after the at least one backtracking;

determining, based on the at least one backtracking, one or more of a set of relevant log sequence number (LSN) ranges and a set of relevant storage offset ranges to reconstruct the database to the desired state;

reconstructing the database to the desired state based on the one or more of the set of relevant LSN ranges and the set of relevant storage offset ranges;

periodically generating clock sampling records, each clock sampling record indicating a timepoint to which the database can be reconstructed, said each clock sampling record including an LSN corresponding to the timepoint, and a storage offset of one or more events, wherein each event is: a log record, an anchor snapshot, or a recovery checkpoint; and generating backtracking information records based on the at least one backtracking, wherein generating the backtracking information records comprises:

generating a set of backtracking information records based on a time order, each backtracking information record of the set of backtracking information records indicating a respective LSN range and further indicating one or more of: a start LSN of the respective LSN range, an end LSN of the respective LSN range, a start storage offset of an event corresponding to the start LSN of the respective LSN range, an end storage offset of the event corresponding to the end LSN of the respective LSN range, wherein the event is a log record, an anchor snapshot, or a recovery checkpoint, the set of backtracking information records including:

an initial backtracking information record wherein the respective start LSN is based on when a backtracking feature of the distributed database system is activated, the respective end LSN is based on when a first backtracking of the at least one backtracking is performed; and at least one backtracking information record corresponding to the at least one backtracking, each backtracking information record of the at least one backtracking information record further indicating a target LSN of the corresponding target timepoint to which the database backtracked, wherein for said each backtracking information record of the at least one backtracking information record, the respective start LSN is based on the end LSN of a previous backtracking information record as determined based on the time order, and wherein the respective end LSN of said each backtracking information record of the at least one backtracking information record is based on when a next backtracking is performed.

2. The method of claim 1 wherein determining, based on the at least one backtracking, the one or more of the set of relevant LSN ranges and the set of relevant storage offset ranges to reconstruct the database to the desired state comprises:

determining, from the set of backtracking information records, a first base backtracking information record of a set of base backtracking information records based on the respective LSN range that includes a desired LSN, the desired LSN corresponding to the desired state, the backtracking information records including the set of base backtracking information records; and performing one or more of:

determining a relevant LSN range of the set of relevant LSN ranges based on a start LSN of the first base backtracking information record and the desired LSN; and for each event of one or more events associated with the first base backtracking information record, determining a relevant storage offset range of the set of relevant storage offset ranges based on a start storage offset of said event of the first base backtracking information record and a storage offset value of said event corresponding to the desired LSN, wherein when the desired LSN is a target for backtracking, one of the clock sampling records corresponds to the desired LSN, and the storage offset value of said event corresponding to the desired LSN is a storage offset value of said event in the clock sampling record corresponding to the desired LSN, otherwise, the storage offset value of said event corresponding to the desired LSN is an indefinite storage offset value, wherein each event of the set of events is a log record, an anchor snapshot, or a recovery checkpoint.

3. The method of claim 2 further comprising, beginning from the first base backtracking information record, for each base backtracking information record of the set of base backtracking information records that indicates a target LSN:

determining, from the backtracking information records, a subsequent base backtracking information record of the set of base backtracking information records based on a corresponding LSN range that includes the target LSN of the base backtracking information record; and performing one or more of:

determining another relevant LSN range of the set of relevant LSN ranges based on a start LSN of the subsequent base backtracking information record and the target LSN of the base backtracking information record; and for each event of one or more events associated with the subsequent base backtracking information record, determining another storage offset range of the set of relevant storage offset ranges based on a start storage offset of said event of the subsequent base backtracking information record and a storage offset value of said event in a clock sampling record corresponding to the target LSN of the base backtracking information record.

4. The method of claim 3, wherein reconstructing the database to the desired state based on the one or more of the set of relevant LSN ranges and the set of relevant storage offset ranges comprises:

determining one or more events for reconstructing the database based on the one or more of the set of relevant LSN ranges and the set of relevant storage offset ranges; and reconstructing the database based on the one or more events determined for reconstructing the database.

5. An apparatus comprising at least one processor and at least one machine-readable medium storing executable instructions which when executed by the at least one processor configure a distributed data system to perform the method of claim 1.

6. The apparatus of claim 5, wherein determining, based on the at least one backtracking, the one or more of the set of relevant LSN ranges and the set of relevant storage offset ranges to reconstruct the database to the desired state comprises:

determining, from the set of backtracking information records, a first base backtracking information record of a set of base backtracking information records based on the respective LSN range that includes a desired LSN, the desired LSN corresponding to the desired state, the backtracking information records including the set of base backtracking information records; and performing one or more of:

determining a relevant LSN range of the set of relevant LSN ranges based on a start LSN of the first base backtracking information record and the desired LSN; and for each event of one or more events associated with the first base backtracking information record, determining a relevant storage offset range of the set of relevant storage offset ranges based on a start storage offset of said event of the first base backtracking information record and a storage offset value of said event corresponding to the desired LSN, wherein when the desired LSN is a target for backtracking, one of the clock sampling records corresponds to the desired LSN, and the storage offset value of said event corresponding to the desired LSN is a storage offset value of said event in the clock sampling record corresponding to the desired LSN, otherwise, the storage offset value of said event corresponding to the desired LSN is an indefinite storage offset value, wherein each event of the set of events is a log record, an anchor snapshot, or a recovery checkpoint.

7. The apparatus of claim 6, wherein the instructions which when executed by the at least one processor further configure the distributed data system for:

beginning from the first base backtracking information record, for each base backtracking information record of the set of base backtracking information records that indicates a target LSN:

determining, from the backtracking information records, a subsequent base backtracking information record of the set of base backtracking information records based on a corresponding LSN range that includes the target LSN of the base backtracking information record; and performing one or more of:

determining another relevant LSN range of the set of relevant LSN ranges based on a start LSN of the subsequent base backtracking information record and the target LSN of the base backtracking information record; and for each event of one or more events associated with the subsequent base backtracking information record, determining another storage offset range of the set of relevant storage offset ranges based on a start storage offset of said event of the subsequent base backtracking information record and a storage offset value of said event in a clock sampling record corresponding to the target LSN of the base backtracking information record.

8. The apparatus of claim 7, wherein reconstructing the database to the desired state based on the one or more of the set of relevant LSN ranges and the set of relevant storage offset ranges comprises:

determining one or more events for reconstructing the database based on the one or more of the set of relevant LSN ranges and the set of relevant storage offset ranges; and reconstructing the database based on the one or more events determined for reconstructing the database.

9. A method by a distributed database system, the method comprising:

performing at least one backtracking of a database, wherein each backtracking reverts the database to a respective target timepoint;

determining a desired state of the database to reconstruct after the at least one backtracking;

determining, based on the at least one backtracking, one or more of a set of relevant log sequence number (LSN) ranges and a set of relevant storage offset ranges to reconstruct the database to the desired state;

reconstructing the database to the desired state based on the one or more of the set of relevant LSN ranges and the set of relevant storage offset ranges; and generating a set of timelines based on a time order, each timeline of the set of timelines indicating a set of LSN ranges and a set of storage offset ranges for an event based on the set of the LSN ranges, the event being a log record, an anchor snapshot, or a recovery checkpoint, the set of timelines including:

an initial timeline indicating a respective last LSN range having a start LSN based on when a backtracking feature of the distributed database system is activated, the respective last LSN range of the initial timeline having an end LSN of when a first backtracking of the at least one backtracking is performed; and at least one timeline corresponding to the at least one backtracking, each timeline of the at least one timeline corresponding to a respective backtracking of the at least one backtracking and associated with a respective target LSN corresponding to the target timepoint of the respective backtracking, wherein a latest timeline of the at least one timeline corresponds to a current timeline associated with a latest backtracking of the at least one backtracking, the current timeline indicating a respective last LSN range with an end LSN being based on when a next backtracking is performed after the at least one backtracking, said each timeline of the at least one timeline indicating a respective set of LSN ranges including:

a respective last LSN range with a start LSN based on an end LSN of a previous timeline, the previous timeline determined according to the time order, the last LSN range ending based on an LSN of when a next backtracking is performed; and one or more pertinent LSN ranges determined from a set of LSN ranges of a corresponding base timeline, the corresponding base timeline determined from the set of timelines and includes in its last LSN range the respective target LSN of said each timeline of the at least one timeline, the one or more pertinent LSN ranges including all LSN ranges up to a last pertinent LSN range, the last pertinent LSN range ending at the respective target LSN of said each timeline of the at least one timeline.

10. The method of claim 9, wherein determining, based on the at least one backtracking, the one or more of the set of relevant LSN ranges and the set of relevant storage offset ranges to reconstruct the database to the desired state comprises:

determining a target timeline from the set of timelines based on a respective last LSN range that includes a desired LSN, the desired LSN corresponding to the desired state;

determining the set of relevant LSN ranges based on all LSN ranges of the target timeline up to a last relevant LSN range, the last relevant LSN range ending at the desired LSN; and determining the set of relevant storage offset ranges being based on a set of storage offset ranges corresponding to the determined set of relevant LSN ranges.

11. An apparatus comprising at least one processor and at least one machine-readable medium storing executable instructions which when executed by the at least one processor configure a distributed data system to perform the method of claim 9.

12. The apparatus of claim 11, wherein the determining, based on the at least one backtracking, the one or more of the set of relevant LSN ranges and the set of relevant storage offset ranges to reconstruct the database to the desired state comprises:

determining a target timeline from the set of timelines based on a respective last LSN range that includes a desired LSN, the desired LSN corresponding to the desired state;

determining the set of relevant LSN ranges based on all LSN ranges of the target timeline up to a last relevant LSN range, the last relevant LSN range ending at the desired LSN; and determining the set of relevant storage offset ranges being based on a set of storage offset ranges corresponding to the determined set of relevant LSN ranges.

13. A method by a distributed database system, the method comprising:

generating clock sampling records indicating a backtracking window via one or more timepoints to which a database can be backtracked;

performing at least one backtracking of the database, each backtracking backtracks the database to a target timepoint; and for each backtracking of the at least one backtracking:

pausing the generation of the clock sampling records;

backtracking the database to the corresponding target timepoint; and resuming the generation of the clock sampling records after receiving an indication from each slice of the database that an anchor snapshot has been generated subsequent to the backtracking.

14. The method of claim 13 further comprising:

generating a set of backtracking information records based on a time order, each backtracking information record of the set of backtracking information records indicating a respective LSN range and further indicating one or more of: a start LSN of the respective LSN range, an end LSN of the respective LSN range, a start storage offset of an event corresponding to the start LSN of the respective LSN range, an end storage offset of the event corresponding to the end LSN of the respective LSN range, wherein the event is a log record, an anchor snapshot, or a recovery checkpoint, the set of backtracking information records including:

an initial backtracking information record wherein the respective start LSN is based on when a backtracking feature of the distributed database system is activated, the respective end LSN is based on when a first backtracking of the at least one backtracking is performed; and at least one backtracking information record corresponding to the at least one backtracking, each backtracking information record of the at least one backtracking information record further indicating a target LSN of the corresponding target timepoint to which the database backtracked, wherein for said each backtracking information record of the at least one backtracking information record, the respective start LSN is based on the end LSN of a previous backtracking information record as determined based on the time order, and wherein the respective end LSN of said each backtracking information record of the at least one backtracking information record is based on when a next backtracking is performed.

15. The method of claim 14, wherein for each backtracking of the at least one backtracking, after pausing and before resuming the generation of the clock sampling records, the method further comprises:

requesting each slice of the database to generate a respective anchor snapshot.

16. The method of claim 13 further comprising:

generating a set of timelines based on a time order, each timeline of the set of timelines indicating a set of LSN ranges and a set of storage offset ranges for an event based on the set of the LSN ranges, the event being a log record, an anchor snapshot, or a recovery checkpoint, the set of timelines including:

an initial timeline indicating a respective last LSN range having a start LSN based on when a backtracking feature of the distributed database system is activated, the respective last LSN range of the initial timeline having an end LSN of when a first backtracking of the at least one backtracking is performed; and at least one timeline corresponding to the at least one backtracking, each timeline of the at least one timeline corresponding to a respective backtracking of the at least one backtracking and associated with a respective target LSN corresponding to the target timepoint of the respective backtracking, wherein a latest timeline of the at least one timeline corresponds to a current timeline associated with a latest backtracking of the at least one backtracking, the current timeline indicating a respective last LSN range with an end LSN being based on when a next backtracking is performed after the at least one backtracking, said each timeline of the at least one timeline indicating a respective set of LSN ranges including:

a respective last LSN range with a start LSN based on an end LSN of a previous timeline, the previous timeline determined according to the time order, the last LSN range ending based on an LSN of when a next backtracking is performed; and one or more pertinent LSN ranges determined from a set of LSN ranges of a corresponding base timeline, the corresponding base timeline determined from the set of timelines and includes in its last LSN range the respective target LSN of said each timeline of the at least one timeline, the one or more pertinent LSN ranges including all LSN ranges up to a last pertinent LSN range, the last pertinent LSN range ending at the respective target LSN of said each timeline of the at least one timeline.

17. The method of claim 16, wherein for each backtracking of the at least one backtracking, after pausing and before resuming the generation of the clock sampling records, the method further comprises:

requesting each slice of the database to generate a respective anchor snapshot.

18. An apparatus comprising at least one processor and at least one machine-readable medium storing executable instructions which when executed by the at least one processor configure a distributed data system for:

generating clock sampling records indicating a backtracking window via one or more timepoints to which a database can be backtracked;

performing at least one backtracking of the database, each backtracking backtracks the database to a target timepoint; and for each backtracking of the at least one backtracking:

pausing the generation of the clock sampling records;

backtracking the database to the corresponding target timepoint; and resuming the generation of the clock sampling records after receiving an indication from each slice of the database that an anchor snapshot has been generated subsequent to the backtracking.

19. The apparatus of claim 18, wherein the instructions which when executed by the at least one processor further configure a distributed data system for:

generating a set of timelines based on a time order, each timeline of the set of timelines indicating a set of LSN ranges and a set of storage offset ranges for an event based on the set of the LSN ranges, the event being a log record, an anchor snapshot, or a recovery checkpoint, the set of timelines including:

an initial timeline indicating a respective last LSN range having a start LSN based on when a backtracking feature of the distributed database system is activated, the respective last LSN range of the initial timeline having an end LSN of when a first backtracking of the at least one backtracking is performed; and at least one timeline corresponding to the at least one backtracking, each timeline of the at least one timeline corresponding to a respective backtracking of the at least one backtracking and associated with a respective target LSN corresponding to the target timepoint of the respective backtracking, wherein a latest timeline of the at least one timeline corresponds to a current timeline associated with a latest backtracking of the at least one backtracking, the current timeline indicating a respective last LSN range with an end LSN being based on when a next backtracking is performed after the at least one backtracking, said each timeline of the at least one timeline indicating a respective set of LSN ranges including:

a respective last LSN range with a start LSN based on an end LSN of a previous timeline, the previous timeline determined according to the time order, the last LSN range ending based on an LSN of when a next backtracking is performed; and one or more pertinent LSN ranges determined from a set of LSN ranges of a corresponding base timeline, the corresponding base timeline determined from the set of timelines and includes in its last LSN range the respective target LSN of said each timeline of the at least one timeline, the one or more pertinent LSN ranges including all LSN ranges up to a last pertinent LSN range, the last pertinent LSN range ending at the respective target LSN of said each timeline of the at least one timeline.

20. The apparatus of claim 19, wherein for each backtracking of the at least one backtracking, after pausing and before resuming the generation of the clock sampling records, the method further comprises:

requesting each slice of the database to generate a respective anchor snapshot.

* * * * *